United States Patent
Weinberg et al.

(10) Patent No.: US 12,327,554 B1
(45) Date of Patent: Jun. 10, 2025

(54) DEVICES AND METHODS FOR INVOKING DIGITAL ASSISTANTS

(71) Applicant: Apple Inc., Cupertino, CA (US)

(72) Inventors: Garrett L. Weinberg, Santa Cruz, CA (US); Susan L. Booker, San Carlos, CA (US); Didier Rene Guzzoni, Montsur-Rolle (CH); Jessica Peck, San Jose, CA (US); Harry J. Saddler, Berkeley, CA (US); Lynn Irene Streja, San Francisco, CA (US); Lily Shuting Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 17/682,691

(22) Filed: Feb. 28, 2022

Related U.S. Application Data

(60) Provisional application No. 63/160,404, filed on Mar. 12, 2021.

(51) Int. Cl.
  *G10L 15/22* (2006.01)
  *G06F 3/01* (2006.01)
  (Continued)

(52) U.S. Cl.
  CPC .............. *G10L 15/22* (2013.01); *G06F 3/011* (2013.01); *G06F 3/04815* (2013.01);
  (Continued)

(58) Field of Classification Search
  None
  See application file for complete search history.

(56) References Cited

U.S. PATENT DOCUMENTS

| | | |
|---|---|---|
| 9,081,411 B2 | 7/2015 | Kalns et al. |
| 9,082,402 B2 | 7/2015 | Yadgar et al. |

(Continued)

FOREIGN PATENT DOCUMENTS

| | | |
|---|---|---|
| IN | 2011MU01537 A | 7/2011 |
| WO | 2016/144840 A1 | 9/2016 |

OTHER PUBLICATIONS

Ashbrook Daniell., "Enabling Mobile Micro interactions", Retrieved from the Internet: URL: http://danielashbrook.com/wp-content/uploads/2012/06/2009-Ashbrook-Thesis.pdf, May 2010, 186 pages.
(Continued)

*Primary Examiner* — Jonathan C Kim
(74) *Attorney, Agent, or Firm* — DLA Piper LLP (US)

(57) ABSTRACT

Devices and methods for invoking digital assistants are provided. An example method includes displaying, on a display, a virtual reality ("VR") environment, wherein the VR environment includes a first avatar representing a domain-specific digital assistant, and wherein the domain-specific digital assistant corresponds to a first domain; and while displaying the first avatar within the VR environment: receiving a user voice input; determining whether the user voice input represents an intent to invoke the domain-specific digital assistant or an intent to invoke a second digital assistant; and in accordance with a determination that the user voice input represents an intent to invoke the second digital assistant: invoking the second digital assistant; determining, based on the user voice input, a first digital assistant response using the second digital assistant; and outputting, via a speaker, the first digital assistant response.

42 Claims, 11 Drawing Sheets

(51) Int. Cl.
  *G06F 3/04815* (2022.01)
  *G06F 3/16* (2006.01)
  *G06T 19/00* (2011.01)

(52) U.S. Cl.
  CPC ............ *G06F 3/167* (2013.01); *G06T 19/006* (2013.01); *G10L 2015/221* (2013.01); *G10L 2015/223* (2013.01)

(56) References Cited

U.S. PATENT DOCUMENTS

| | | | |
|---|---|---|---|
| 9,575,964 | B2 | 2/2017 | Yadgar et al. |
| 10,521,946 | B1 | 12/2019 | Roche et al. |
| 10,732,708 | B1 | 8/2020 | Roche et al. |
| 2013/0275138 | A1 | 10/2013 | Gruber et al. |
| 2014/0310002 | A1 | 10/2014 | Nitz et al. |
| 2014/0337266 | A1 | 11/2014 | Wolverton et al. |
| 2014/0337814 | A1 | 11/2014 | Kalns et al. |
| 2014/0365880 | A1 | 12/2014 | Bellegarda |
| 2015/0186156 | A1* | 7/2015 | Brown .................. H04L 51/02 715/706 |
| 2015/0348533 | A1 | 12/2015 | Saddler et al. |
| 2016/0026242 | A1 | 1/2016 | Burns et al. |
| 2016/0335138 | A1 | 11/2016 | Surti et al. |
| 2017/0116989 | A1 | 4/2017 | Yadgar et al. |
| 2017/0300831 | A1* | 10/2017 | Gelfenbeyn .......... H04L 51/214 |
| 2018/0060088 | A1* | 3/2018 | Baer ..................... G06F 16/907 |
| 2018/0190274 | A1* | 7/2018 | Kirazci .................. G10L 15/22 |
| 2018/0366118 | A1* | 12/2018 | Lovitt .................. G10L 15/063 |
| 2020/0143185 | A1* | 5/2020 | Zhang .................. G10L 15/22 |
| 2020/0227034 | A1* | 7/2020 | Summa ................ G10L 15/22 |
| 2020/0286479 | A1* | 9/2020 | Kurihara ................ B60K 35/85 |
| 2020/0317055 | A1* | 10/2020 | Kurihara ................ G10L 15/26 |
| 2020/0321001 | A1* | 10/2020 | Naiki ..................... G06F 3/167 |
| 2020/0342874 | A1* | 10/2020 | Teserra ................ G06F 40/263 |
| 2020/0349966 | A1* | 11/2020 | Konzelmann .......... G06F 40/20 |
| 2021/0216134 | A1* | 7/2021 | Fukunaga .............. G06F 3/167 |
| 2021/0256967 | A1* | 8/2021 | Iacobelli .............. G10L 15/183 |
| 2021/0327421 | A1* | 10/2021 | Beaufays ............. G10L 15/065 |
| 2022/0005470 | A1* | 1/2022 | Sugihara ............. B60R 16/0373 |
| 2022/0028366 | A1* | 1/2022 | Kephart .................. G10L 15/26 |
| 2022/0100961 | A1* | 3/2022 | Vishnoi ................. G06F 16/35 |
| 2022/0255995 | A1* | 8/2022 | Berliner ................. H04W 4/80 |
| 2022/0284904 | A1* | 9/2022 | Pu ........................... G06F 40/35 |
| 2023/0120370 | A1* | 4/2023 | Koll ....................... G06F 3/013 704/275 |
| 2023/0139626 | A1* | 5/2023 | Berliner ................ G06F 1/1694 345/156 |

OTHER PUBLICATIONS

Bell Jason, "Machine Learning Hands-On for Developers and Technical Professionals", Wiley, Nov. 3, 2014, 82 pages.

Phoenix Solutions, Inc., "Declaration of Christopher Schmandt Regarding the MIT Galaxy System", West Interactive Corp., a Delaware Corporation, Document 40, Jul. 2, 2010, 162 pages.

Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.

* cited by examiner

DEVICES AND METHODS FOR INVOKING DIGITAL ASSISTANTS

This application claims priority from U.S. Provisional Ser. No. 63/160,404, filed on Mar. 12, 2021, entitled "DEVICES AND METHODS FOR INVOKING DIGITAL ASSISTANTS," which is hereby incorporated by reference in its entirety for all purposes.

FIELD

This relates generally to digital assistants and, more specifically, to invoking digital assistants based on user input.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, however, a user may provide a request that either too specific or complex for a system-level digital assistant, particularly when in use with various extended reality technologies.

SUMMARY

Example methods are disclosed herein. An example method includes displaying, on a display, a virtual reality ("VR") environment, wherein the VR environment includes a first avatar representing a domain-specific digital assistant, and wherein the domain-specific digital assistant corresponds to a first domain; and while displaying the first avatar within the VR environment: receiving a user voice input; determining whether the user voice input represents an intent to invoke the domain-specific digital assistant or an intent to invoke a second digital assistant; and in accordance with a determination that the user voice input represents an intent to invoke the second digital assistant: invoking the second digital assistant; determining, based on the user voice input, a first digital assistant response using the second digital assistant; and outputting, via a speaker, the first digital assistant response.

Example non-transitory computer-readable media are disclosed herein. An example non-transitory computer-readable storage medium stores one or more programs. The one or more programs comprise instructions, which when executed by one or more processors of an electronic device having a display, cause the electronic device to display, on the display, a virtual reality ("VR") environment, wherein the VR environment includes a first avatar representing a domain-specific digital assistant, and wherein the domain-specific digital assistant corresponds to a first domain; and while displaying the first avatar within the VR environment: receive a user voice input; determine whether the user voice input represents an intent to invoke the domain-specific digital assistant or an intent to invoke a second digital assistant; and in accordance with a determination that the user voice input represents an intent to invoke the second digital assistant: invoke the second digital assistant; determine, based on the user voice input, a first digital assistant response using the second digital assistant; and output, via a speaker, the first digital assistant response.

Example transitory computer-readable media are disclosed herein. An example non-transitory computer-readable storage medium stores one or more programs. The one or more programs comprise instructions, which when executed by one or more processors of an electronic device having a display, cause the electronic device to display, on the display, a virtual reality ("VR") environment, wherein the VR environment includes a first avatar representing a domain-specific digital assistant, and wherein the domain-specific digital assistant corresponds to a first domain; and while displaying the first avatar within the VR environment: receive a user voice input; determine whether the user voice input represents an intent to invoke the domain-specific digital assistant or an intent to invoke a second digital assistant; and in accordance with a determination that the user voice input represents an intent to invoke the second digital assistant: invoke the second digital assistant; determine, based on the user voice input, a first digital assistant response using the second digital assistant; and output, via a speaker, the first digital assistant response.

Example electronic devices are disclosed herein. An example electronic device comprises a display, one or more processors; a memory; and one or more programs, where the one or more programs are stored in the memory and configured to be executed by the one or more processors, the one or more programs including instructions for displaying, on the display, a virtual reality ("VR") environment, wherein the VR environment includes a first avatar representing a domain-specific digital assistant, and wherein the domain-specific digital assistant corresponds to a first domain; and while displaying the first avatar within the VR environment: receiving a user voice input; determining whether the user voice input represents an intent to invoke the domain-specific digital assistant or an intent to invoke a second digital assistant; and in accordance with a determination that the user voice input represents an intent to invoke the second digital assistant: invoking the second digital assistant; determining, based on the user voice input, a first digital assistant response using the second digital assistant; and outputting, via a speaker, the first digital assistant response.

An example electronic device comprises a display, means for displaying, on the display, a virtual reality ("VR") environment, wherein the VR environment includes a first avatar representing a domain-specific digital assistant, and wherein the domain-specific digital assistant corresponds to a first domain; and means for, while displaying the first avatar within the VR environment: receiving a user voice input; determining whether the user voice input represents an intent to invoke the domain-specific digital assistant or an intent to invoke a second digital assistant; and in accordance with a determination that the user voice input represents an intent to invoke the second digital assistant: invoking the second digital assistant; determining, based on the user voice input, a first digital assistant response using the second digital assistant; and outputting, via a speaker, the first digital assistant response.

Selectively invoking a domain-specific digital assistant or a second digital assistant allows for a more intuitive and efficient user experience. For example, handling user requests during display of a VR environment allows for requests related to the user's VR experience to be handled without interrupting VR immersion. In turn, this provides for more efficient use of the electronic device (e.g., by avoiding interruption of the display of a VR environment to handle the request), which, additionally, reduces power usage and improves battery life of the device. As another example, handling requests using any of a number of digital assistants (e.g., domain-specific digital assistants, general digital assistants) avoids processing request with digital assistants that may not be capable of properly handling the requests. In turn, this provides for more efficient use of the electronic device (e.g., reducing number of instances in which requests are improperly handled), which, additionally, reduces power usage and improves battery life of the device.

DESCRIPTION

Figure 1A:
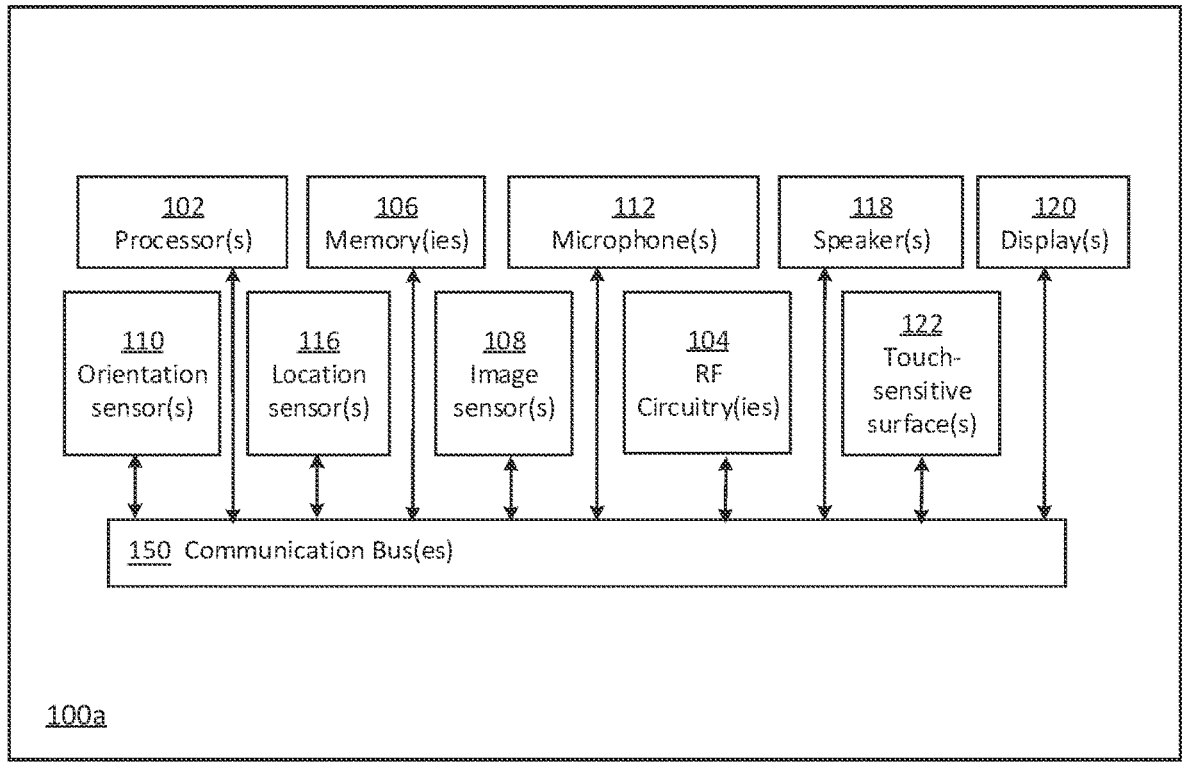
FIGS. 1A-1B depict exemplary systems for use in various extended reality technologies, including virtual reality and mixed reality.

Various examples of electronic systems and techniques for using such systems in relation to various extended reality technologies are described.

Physical settings are those in the world where people can sense and/or interact without use of electronic systems. For example, a room is a physical setting that includes physical elements, such as, physical chairs, physical desks, physical lamps, and so forth. A person can sense and interact with these physical elements of the physical setting through direct touch, taste, sight, smell, and hearing.

In contrast to a physical setting, an extended reality (XR) setting refers to a computer-produced environment that is partially or entirely generated using computer-produced content. While a person can interact with the XR setting using various electronic systems, this interaction utilizes various electronic sensors to monitor the person's actions, and translates those actions into corresponding actions in the XR setting. For example, if a XR system detects that a person is looking upward, the XR system may change its graphics and audio output to present XR content in a manner consistent with the upward movement. XR settings may respect laws of physics to mimic physical settings.

Concepts of XR include virtual reality (VR) and augmented reality (AR). Concepts of XR also include mixed reality (MR), which is sometimes used to refer to the spectrum of realities from between physical settings (but not including physical settings) at one end and VR at the other end. Concepts of XR also include augmented virtuality (AV), in which a virtual or computer-produced setting integrates sensory inputs from a physical setting. These inputs may represent characteristics of a physical setting. For example, a virtual object may take on a color captured, using an image sensor, from the physical setting. Or, an AV setting may adopt current weather conditions of the physical setting.

Some electronic systems for implementing XR operate with an opaque display and one or more imaging sensors for capturing video and/or images of a physical setting. In some implementations, when a system captures images of a physical setting, and displays a representation of the physical setting on an opaque display using the captured images, the displayed images are called a video pass-through. Some electronic systems for implementing XR operate with a transparent or semi-transparent display (and optionally with one or more imaging sensors). Such a display allows a person to view a physical setting directly through the display, and also allows for virtual content to be added to the person's field of view by superimposing the content and over the physical setting. Some electronic systems for implementing XR operate with a projection system that projects virtual objects onto a physical setting. The projector may present a holograph onto a physical setting, or may project imagery onto a physical surface, or may project onto the eyes (e.g., retina) of a person, for example.

Electronic systems providing XR settings can have various form factors. A smart phone or tablet computer may incorporate imaging and display components to provide a XR setting. A head mount system may include imaging and display components to provide a XR setting. These systems may provide computing resources for providing XR settings, and may work in conjunction with one another to provide XR settings. For example, a smartphone or a tablet can connect with a head mounted display to provide XR settings. Or, a computer may connect with home entertainment components or vehicular systems to provide an on-window display or a heads-up display. Electronic systems providing XR settings may utilize display technologies such as LEDs, OLEDs, liquid crystal on silicon, a laser scanning light source, a digital light projector, or combinations thereof. Display technologies can employ substrates, through which light is transmitted, including light waveguides, holographic substrates, optical reflectors and combiners, or combinations thereof.

Figure 1B:
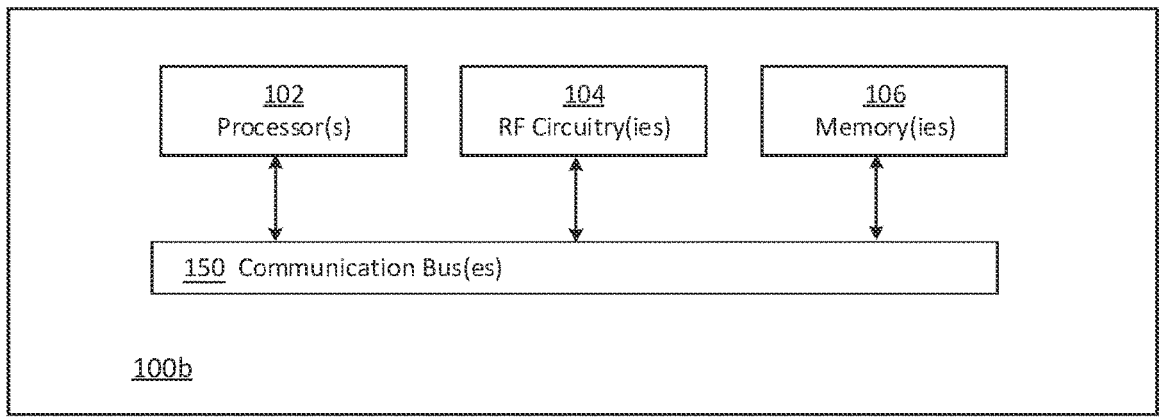
Figure 1B:
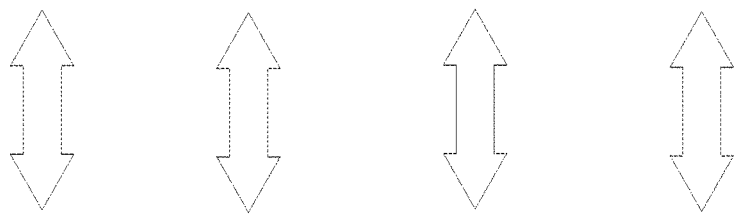
Figure 1B:
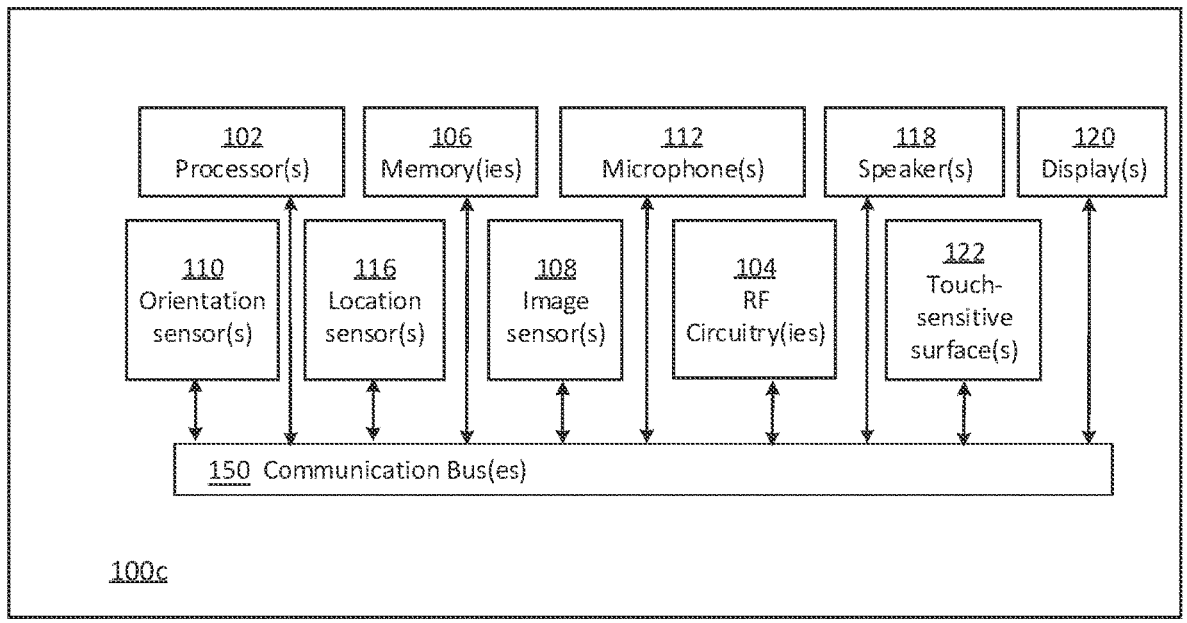

FIG. 1A and FIG. 1B depict exemplary system 100 for use in various extended reality technologies.

In some examples, as illustrated in FIG. 1A, system 100 includes device 100a. Device 100a includes various components, such as processor(s) 102, RF circuitry (ies) 104, memory (ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a second device (e.g., a head-mounted device). In some examples, device 100a is implemented in a base station device or a second device.

As illustrated in FIG. 1B, in some examples, system 100 includes two (or more) devices in communication, such as through a wired connection or a wireless connection. First device 100b (e.g., a base station device) includes processor(s) 102, RF circuitry (ies) 104, and memory (ies) 106. These components optionally communicate over communication bus(es) 150 of device 100b. Second device 100c (e.g., a head-mounted device) includes various components, such as processor(s) 102, RF circuitry (ies) 104, memory (ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory (ies) 106. Processor(s) 102 include one or more general processors, one or more graphics processors, and/or one or more digital signal processors. In some examples, memory (ies) 106 are one or more non-transitory computer-readable storage mediums (e.g., flash memory, random access memory) that store computer-readable instructions configured to be executed by processor(s) 102 to perform the techniques described below.

System 100 includes RF circuitry (ies) 104. RF circuitry (ies) 104 optionally include circuitry for communicating with electronic devices, networks, such as the Internet, intranets, and/or a wireless network, such as cellular networks and wireless local area networks (LANs). RF circuitry (ies) 104 optionally includes circuitry for communicating using near-field communication and/or short-range communication, such as Bluetooth®.

System 100 includes display(s) 120. Display(s) 120 may have an opaque display. Display(s) 120 may operate with a transparent or semi-transparent display (and optionally with one or more imaging sensors). Such a display allows a person to view a physical setting directly through the display, and also allows for virtual content to be added to the person's field of view by superimposing the content and over the physical setting. Display(s) 120 may incorporate display technologies such as LEDs, OLEDs, liquid crystal on silicon, a laser scanning light source, a digital light projector, or combinations thereof. Display 120 can employ substrates, through which light is transmitted, including light waveguides, holographic substrates, optical reflectors and combiners, or combinations thereof. In one example, the transparent or semi-transparent display may transition selectively between an opaque state and a transparent or semi-transparent state. Other example implementations of display(s) 120 include, but are not limited to heads up displays, display-capable automotive windshields, display-capable windows, display-capable lenses, tablets, smartphones, desktop computers, or laptop computers. Alternatively, system 100 may be designed to interface with an external display (e.g., display of a smartphone). In some examples, system 100 is a projection-based system that uses retinal projection to project images onto the eyes (e.g., retina) of a person or projects virtual objects onto a physical setting (e.g., project imagery onto a physical surface or a holograph onto a physical setting).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Figure 2A:
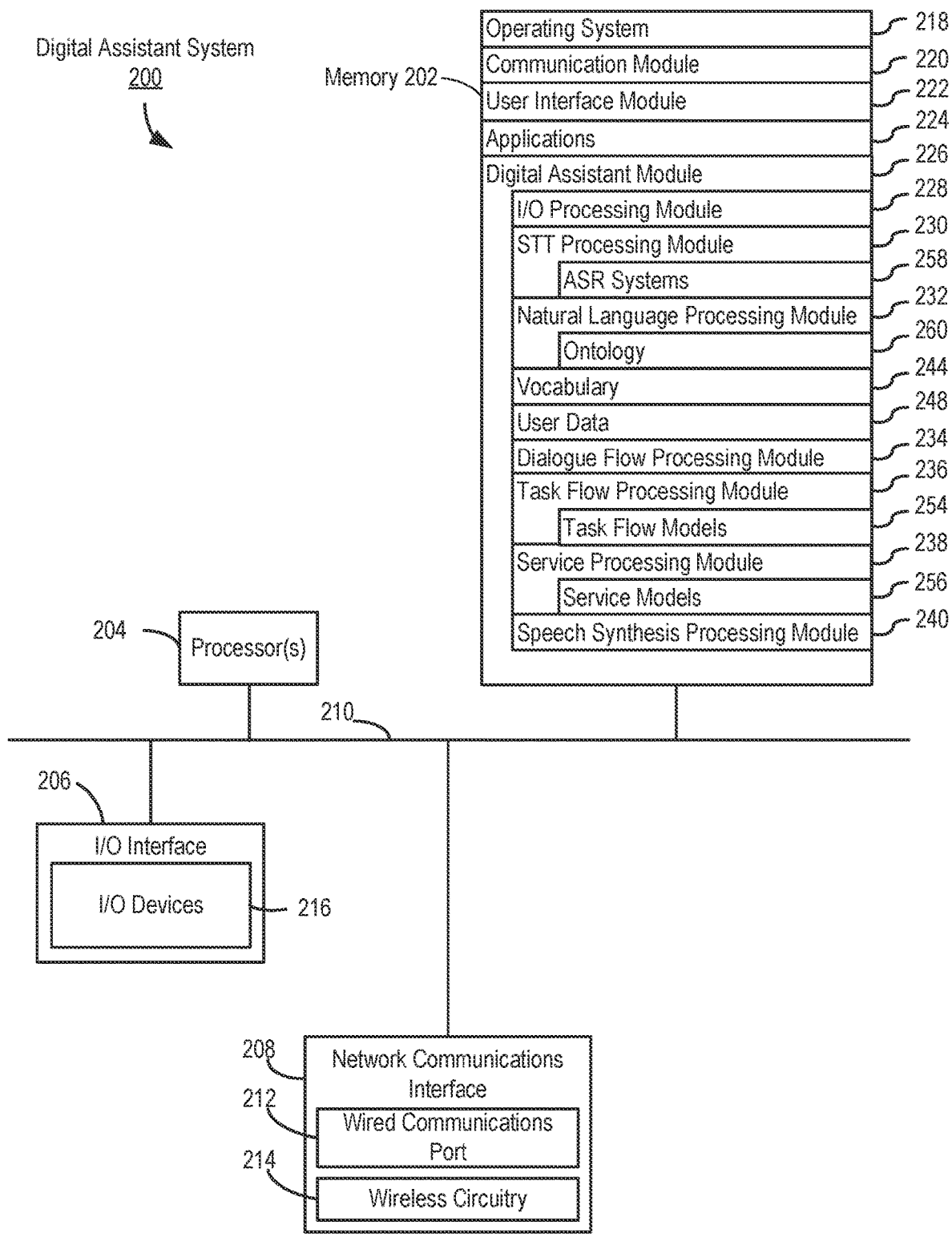
FIG. 2A is a block diagram illustrating a digital assistant system or a server portion thereof, according to various examples.

FIG. 2A illustrates a block diagram of digital assistant 200 in accordance with various examples. In some examples, digital assistant 200 is implemented on a standalone computer system. In some examples, digital assistant 200 is distributed across multiple computers and/or systems. In some examples, some of the modules and functions of the digital assistant are divided into a server portion and a client portion, where the client portion resides on one or more user devices (e.g., device 100a, 100b) or systems (e.g., system 100) and, optionally, communicates with the server portion through one or more networks, It should be noted that digital assistant 200 is only one example of a digital assistant, and that digital assistant 200 can have more or fewer components than shown, can combine two or more components, or can have a different configuration or arrangement of the components. The various components shown in FIG. 2A are implemented in hardware, software instructions for execution by one or more processors, firmware, including one or more signal processing and/or application specific integrated circuits, or a combination thereof.

In some examples, the digital assistant can perform at least some of the following: convert speech input into text; identify a user's intent expressed in a natural language input received from the user; actively elicit and obtain information needed to fully infer the user's intent (e.g., by disambiguating words, games, intentions, etc.); determine the task flow for fulfilling the inferred intent; and execute the task flow to fulfill the inferred intent.

Figure 2B:
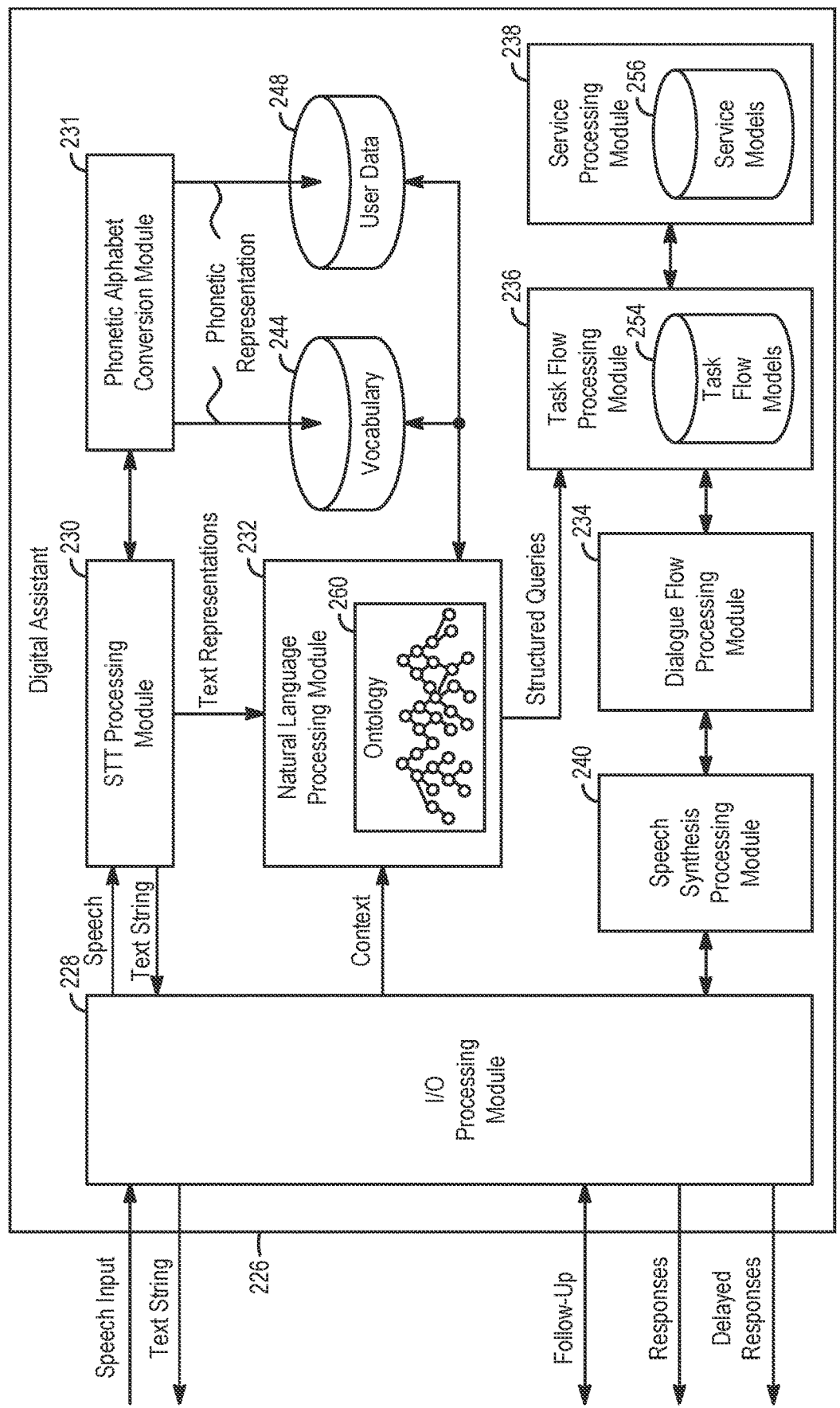
FIG. 2B illustrates the functions of the digital assistant shown in FIG. 2A, according to various examples.

By way of example, with reference to FIG. 2B, the digital assistant 200 can obtain user input (e.g., a speech input), for instance, using I/O processing module 228, and provide responses (e.g., as speech outputs) to the user input. Digital assistant 200 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device (or system) at the time the user request is received, and/or information related to the surrounding environment of the user at the time that the user request was received. In some examples, the digital assistant 200 also sends follow-up questions to, and receive answers from, the user regarding the user request. When a user request is received by the digital assistant 200 and the user request includes speech input, the digital assistant 200 forwards the speech input to STT processing module 230 (or speech recognizer) for speech-to-text conversions.

Natural language processing module 232 ("natural language processor") of the digital assistant takes the n-best candidate text representation(s) ("word sequence(s)" or "token sequence(s)") generated by STT processing module 230, and attempts to associate each of the candidate text representations with one or more "actionable intents" recognized by the digital assistant. An "actionable intent" (or "user intent") represents a task that can be performed by the digital assistant, and can have an associated task flow implemented in task flow models 254. The associated task flow is a series of programmed actions and steps that the digital assistant takes in order to perform the task. The scope of a digital assistant's capabilities is, in some examples, dependent on the number and variety of task flows that have been implemented and stored in task flow models 254, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 230, natural language processing module 232 also receives contextual information associated with the user request. The natural language processing module 232 optionally uses the contextual information to clarify, supplement, and/or further define the information contained in the candidate text representations In some examples, the natural language processing is based on, e.g., ontology 260. Ontology 260 is a hierarchical structure containing many nodes, each node representing either an "actionable intent" or a "property" relevant to one or more of the "actionable intents" or other "properties". A "property" represents a parameter associated with an actionable intent or a sub-aspect of another property. A linkage between an actionable intent node and a property node in ontology 260 defines how a parameter represented by the property node pertains to the task represented by the actionable intent node.

Figure 2C:
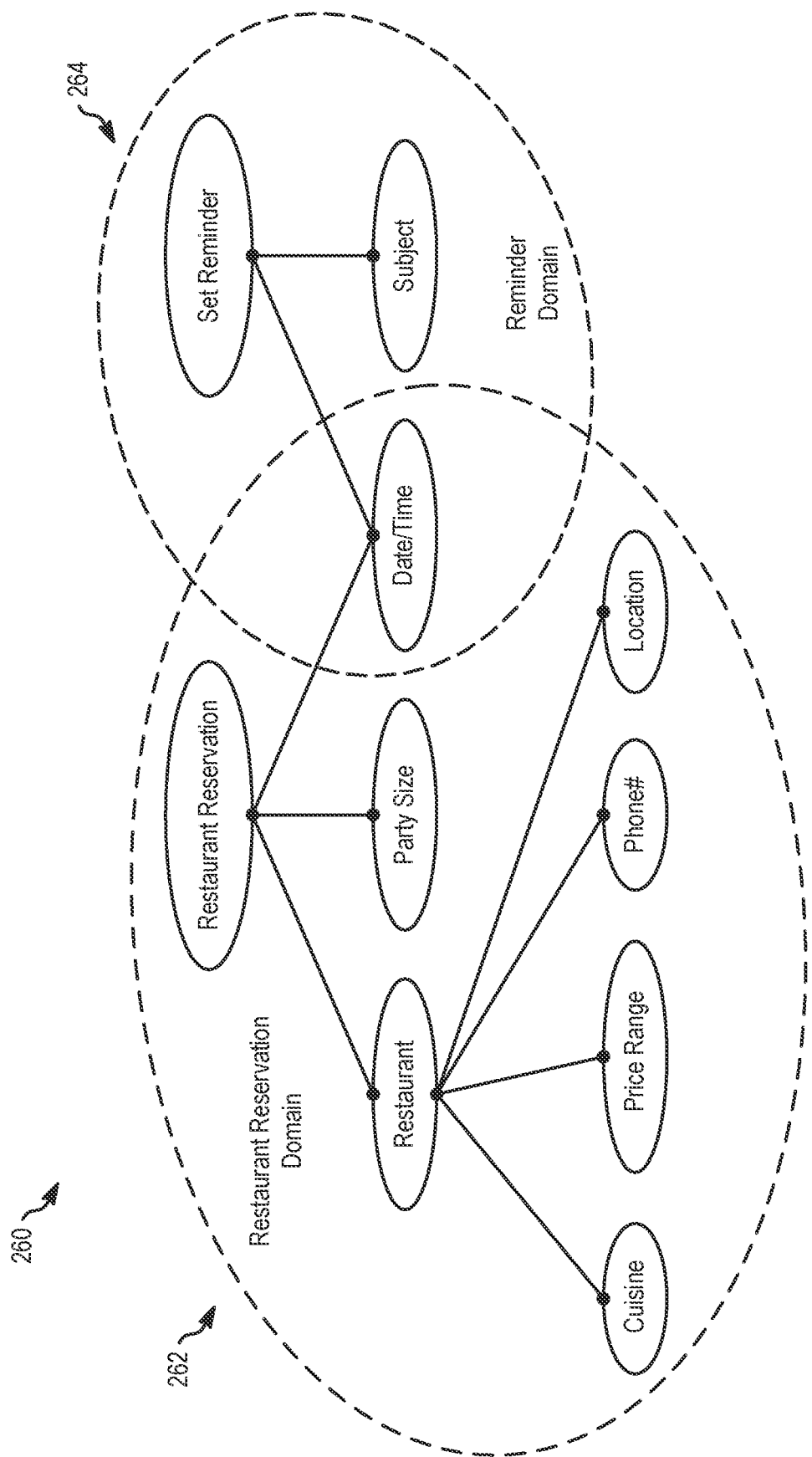
FIG. 2C illustrates a portion of an ontology, according to various examples.

In some examples, ontology 260 is made up of actionable intent nodes and property nodes. Within ontology 260, each actionable intent node is linked to one or more property nodes either directly or through one or more intermediate property nodes. Similarly, each property node is linked to one or more actionable intent nodes either directly or through one or more intermediate property nodes. For example, as shown in FIG. 2C, ontology 260 includes a "restaurant reservation" node (i.e., an actionable intent node). Property nodes "restaurant," "date/time" (for the reservation), and "party size" are each directly linked to the actionable intent node (i.e., the "restaurant reservation" node).

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 2C, ontology 260 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 260.

An actionable intent node, along with its linked property nodes, is described as a "domain." In the present discussion, each domain is associated with a respective actionable intent, and refers to the group of nodes (and the relationships there between) associated with the particular actionable intent. For example, ontology 260 shown in FIG. 2C includes an example of restaurant reservation domain 262 and an example of reminder domain 264 within ontology 260. The restaurant reservation domain includes the actionable intent node "restaurant reservation," property nodes "restaurant," "date/time," and "party size," and sub-property nodes "cuisine," "price range," "phone number," and "location." Reminder domain 264 includes the actionable intent node "set reminder," and property nodes "subject" and "date/time." In some examples, ontology 260 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 262 and reminder domain 264.

While FIG. 2C illustrates two example domains within ontology 260, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 260 includes all domains (and hence actionable intents) that the digital assistant is capable of understanding and acting upon. In some examples, ontology 260 is modified, such as by adding or removing entire domains or nodes, or by modifying relationships between the nodes.

In some examples, nodes associated with multiple related actionable intents are clustered under a "super domain" in ontology 260. For example, a "travel" super-domain includes a cluster of property nodes and actionable intent nodes related to travel. In some examples, a digital assistant may be a domain-specific digital assistant capable of understanding and acting upon a single domain.

In some examples, each node in ontology 260 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 244 in association with the property or actionable intent represented by the node. For example, returning to FIG. 2B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 244 optionally includes words and phrases in different languages.

Natural language processing module 232 receives the candidate text representations (e.g., text string(s) or token sequence(s)) from STT processing module 230, and for each candidate representation, determines what nodes are implicated by the words in the candidate text representation. In some examples, if a word or phrase in the candidate text representation is found to be associated with one or more nodes in ontology 260 (via vocabulary index 244), the word or phrase "triggers" or "activates" those nodes. Based on the quantity and/or relative importance of the activated nodes, natural language processing module 232 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 248 includes user-specific information, such as user-specific vocabulary, user preferences, user address, user's default and secondary languages, user's contact list, and other short-term or long-term information for each user. In some examples, natural language processing module 232 uses the user-specific information to supplement the information contained in the user input to further define the user intent. For example, for a user request "invite my friends to my birthday party," natural language processing module 232 is able to access user data 248 to determine who the "friends" are and when and where the "birthday party" would be held, rather than requiring the user to provide such information explicitly in his/her request.

In some examples, once natural language processing module 232 identifies an actionable intent (or domain) based on the user request, natural language processing module 232 generates a structured query to represent the identified actionable intent.

Task flow processing module 236 is configured to receive the structured query (or queries) from natural language processing module 232, complete the structured query, if necessary, and perform the actions required to "complete" the user's request. In some examples, the various procedures necessary to complete these tasks are provided in task flow models 254. In some examples, task flow models 254 include procedures for obtaining additional information from the user and task flows for performing actions associated with the actionable intent.

Once task flow processing module 236 has completed the structured query for an actionable intent, task flow processing module 236 proceeds to perform the task associated with the actionable intent.

In some examples, natural language processing as described herein may be implemented in a domain-specific manner. By way of example, once a domain has been determined, NLP may be performed by NLP module 232, or may be performed by one or more domain-specific NLP modules (which, optionally, may be included in NLP module 232) to generate a domain-specific structured query (e.g., a structured query that may, optionally, include tasks and/or parameters not included in a corresponding standard structure query for the domain). Additionally or alternatively, such domain-specific structured queries may be handled by either task flow processing module 236 and/or one or more domain-specific task flow processing modules (which, optionally, may be included in task flow processing module 236).

Examples described herein are directed to invoking digital assistants. Generally, a user may provide an input (e.g., voice input) including a request that system 100 perform one or more tasks. In response, system 100 may invoke (e.g., selectively invoke) one or more digital assistants, which in turn may process the input (e.g., derive and/or perform the one or more tasks from the input).

As will be explained in more detail below, in some examples, system 100 may determine whether a user input represents an intent to invoke a digital assistant of system 100, such as a domain-specific digital assistant associated with an XR environment, another domain-specific digital assistant, or a general digital assistant. In some examples, whether a user input represents an intent to invoke a particular digital assistant of system 100 is determined based on a set of factors, including but not limited to a user input provided by a user, context of the user, context of system 100, capabilities of one or more digital assistants of system 100, or any combination thereof. If system 100 determines that a user input represents an intent to invoke a digital assistant, system 100 invokes the digital assistant to process the user input.

As used herein, a domain-specific digital assistant refers to a digital assistant corresponding to one or more specific domains (e.g., one or more application-specific domains), for instance, of an active ontology (e.g., navigation, weather, restaurant reservations, etc.) such that the domain-specific digital assistant is capable of processing user inputs relating to or associated with the one or more specific domains. In some examples, a domain-specific digital assistant corresponds to a single domain (e.g., travel reservations) and/or one or more subdomains of the domain (e.g., flight reservations, hotel reservations). In some examples, a domain-specific digital assistant corresponds to multiple domains that are, optionally, associated with each other (e.g., movies, TV shows). It will be appreciated that, in some examples, multiple digital assistants may correspond to one or more same domains. For instance, a domain-specific digital assistant and a general digital assistant may both correspond to a weather domain.

In some examples, a domain-specific digital assistant operates according to a knowledge base that is not available to a general digital assistant (e.g., general digital assistant of system 100). Accordingly, a domain-specific digital assistant may, be capable of processing user inputs (e.g., performing functions and/or actions) that a general digital assistant is not capable of processing, or may be able to more effectively process particular user inputs than a general digital assistant (e.g., process requests more accurately and/or provide more salient results). By way of example, a user input may include a request for weather information. While a general digital assistant of system 100 may be capable of processing the request to provide weather information, a domain-specific digital assistant corresponding to a weather domain may be capable of providing more comprehensive and/or specific weather information than the general digital assistant.

In some examples, a domain-specific digital assistant is associated with an application (e.g., third party application). Accordingly, domain-specific digital assistants may operate according to a knowledge base provided by the application. As an example, a domain-specific digital assistant associated with a shopping application may be capable of performing more complex tasks for online shopping than a general digital assistant, even if the domain-specific digital assistant and general digital assistant are implemented on a same system or device.

In some examples, digital assistants may be invoked while an extended reality environment is displayed. FIGS. 3A-3F, for instance, illustrate an exemplary extended reality ("XR") environment 300 in which one or more digital assistants may be invoked, according to various examples. In some examples, XR environment 300 is a VR environment. In other examples, XR environment 300 is an AR environment. In some examples, XR environment 300 is displayed via a display device (e.g., display(s) 120 of system 100).

As shown, XR environment 300 includes avatars 304, 308. In some examples, avatar 304 is a representation of the user in the XR environment 300 and/or indicates a location of the user in the XR environment 300. In some examples, avatar 308 is a representation of digital assistant 309, and digital assistant 309 may interface with a user in XR environment 300 via avatar 308. Digital assistant 309 may, for instance, receive inputs from the user, perform tasks derived from the inputs, and provide responses to the user after performing the tasks, as described. While XR environment 300 is shown from a third-person perspective in FIGS. 3A-3F, it will be understood that, in some examples, XR environment 300 is displayed from the perspective of user 304 (FIGS. 4A-4C) such that a user of system 100 can interact with XR environment 300 with a first-person perspective.

In some examples, XR environment 300 is associated with a software application (e.g., third party software application). XR environment 300 may, for instance, be an XR environment of the application or an XR environment including one or more virtual objects specified by the application. The software application may reside on system 100 or may reside on another device or system remotely accessible by system 100.

In some examples, digital assistant 309 is a domain-specific digital assistant associated with an application. Accordingly, digital assistant 309 may correspond to one or more domains of the application and, optionally, operate according to a knowledge base of the application. In this manner, digital assistant 309 may be capable of processing user inputs relating to or associated with the domain(s) of the application, as described. In some examples, XR environment 300 and digital assistant 309 are associated with a same application. As a result, digital assistant 309 may handle application-specific user requests while a user interacts with XR environment 300.

Figure 3A:
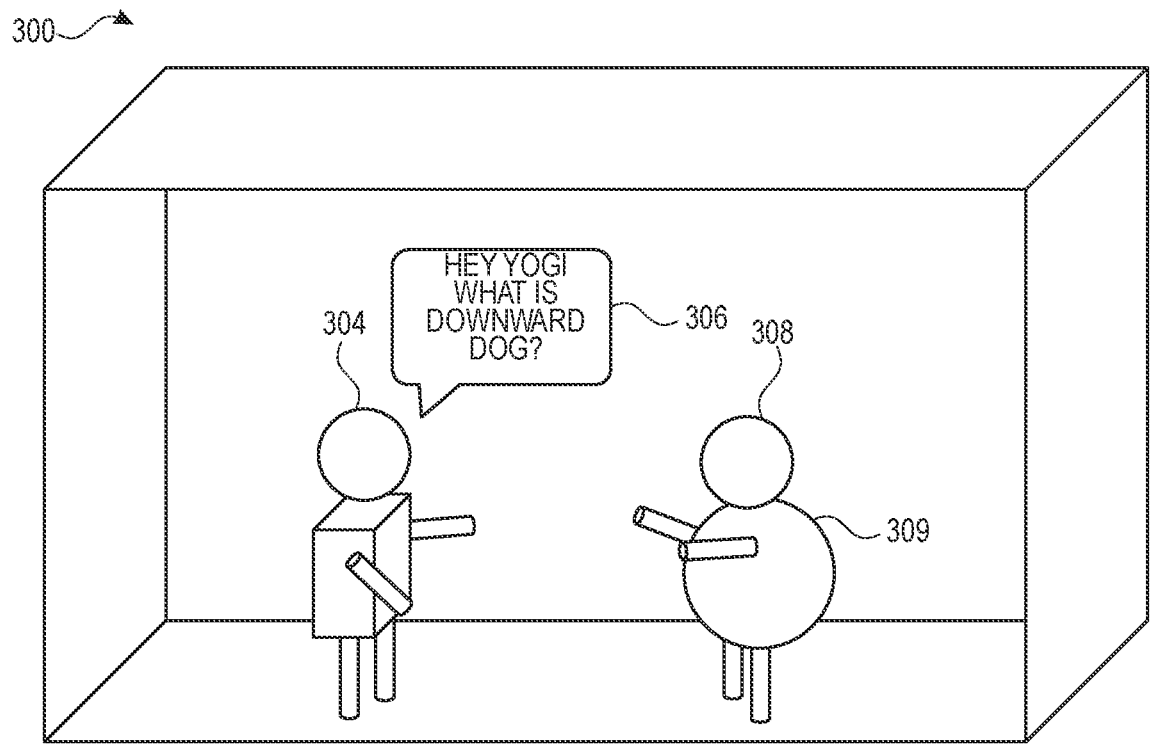
FIGS. 3A-3F illustrate an extended reality environment, according to various examples
Figure 3B:
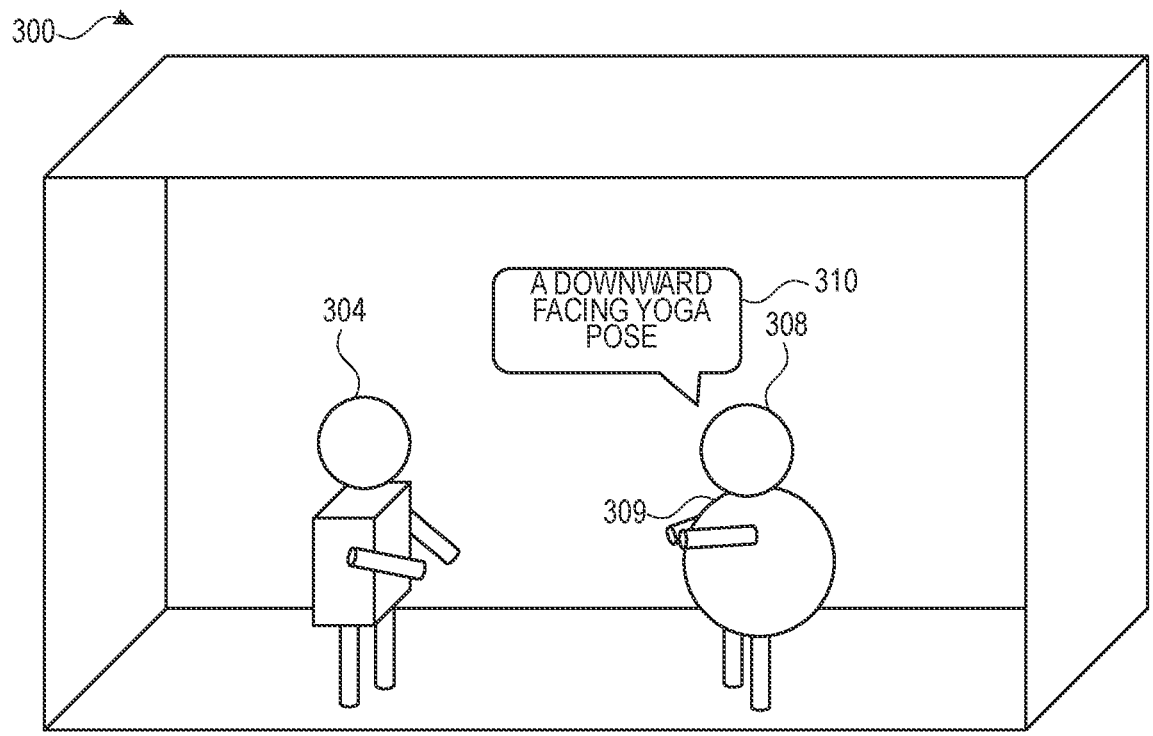

FIGS. 3A-3B illustrate an example in which a user input represents an intent to invoke a domain-specific digital assistant of XR environment 300.

With reference to FIG. 3A, in an example operation, system 100 receives user input 306 ("Hey Yogi, what is downward dog?") while displaying the XR environment 300. User input 306 may be provided as a voice input, but may additionally or alternatively be provided as textual input, gesture, or any combination thereof.

In some examples, system 100 determines whether a user input represents an intent to invoke a digital assistant. In some examples, determining whether a user input represents an intent to invoke a digital assistant includes determining, for each digital assistant of a set of digital assistants of system 100, whether the user input represents an intent to invoke the digital assistant. System 100 may, for instance, select a digital assistant of system 100 best suited to process a user input and determine that the user input represents an intent to invoke the selected digital assistant.

In some examples, system 100 determines a user input represents an intent to invoke a digital assistant if the user input explicitly invokes a particular digital assistant. For example, system 100 may determine whether the user input 306 includes a digital assistant trigger for digital assistant 309 (e.g., "Hey Yogi"). If so, system 100 may determine that the user input represents an intent to invoke digital assistant 309.

In some examples, system 100 determines whether a user input represents an intent to invoke a digital assistant based on context of the user. Context of the user may include but is not limited to a direction of a user's gaze, location of the user (e.g., a location of system 100 and/or a location of avatar 304 in XR environment 300), prior user activity (e.g., user actions performed on system 100), or any combination thereof. By way of example, system 100 may determine whether a gaze of the user is directed at avatar 308 (e.g., as indicated by the direction of gaze of avatar 304 or by a direction of the user's gaze relative to display 120), for instance, during a period of time in which the user input 306 is received or within a predetermined period of time after user input 306 is received. If the direction of the gaze of the user satisfies gaze criteria such that system 100 determines that the gaze of the user is directed at avatar 308, system 100 may determine user input 306 represents an intent to invoke digital assistant 309.

In some examples, system 100 determines whether a user input represents an intent to invoke a digital assistant based on capabilities of one or more digital assistants of system 100. By way of example, system 100 may identify one or more domains corresponding to user input 306 (e.g., using natural-language processing) and determine whether the identified one or more domains match one or more domains of digital assistants of system 100 (e.g., determine if the identified one or more domains include a yoga domain). If, for instance, a domain of user input 306 matches a domain of digital assistant 309, system 100 may determine user input 306 represents an intent to invoke digital assistant 309. In some examples, a domain of user input 306 may match a domain of multiple digital assistants. System 100 may identify the digital assistant best suited to process user input 306 and determine that user input 306 represents an intent to invoke the digital assistant determined to be best suited to process user input 306.

Additionally or alternatively, system 100 may determine whether the identified one or more domains of a user input match a domain of an application associated with digital assistants of system 100. In an example in which digital assistant 309 is associated with a yoga application, for instance, system 100 may determine whether the identified one or more domains of user input 306 match a domain of the yoga application (e.g., exercise domain, yoga subdomain, etc.). If system 100 determines a match exists, system 100 may determine that an user input 306 represents an intent to invoke digital assistant 309.

With reference to FIG. 3B, in response to determining that user input 306 represents an intent to invoke digital assistant 309, system 100 invokes digital assistant 309. Once invoked, digital assistant 309 processes user input 306 (e.g., performs one or more tasks indicated by a request of user input 306) and, optionally, generates a response to the request of user input 306, such as the response 310 ("A downward facing yoga pose").

Figure 3C:
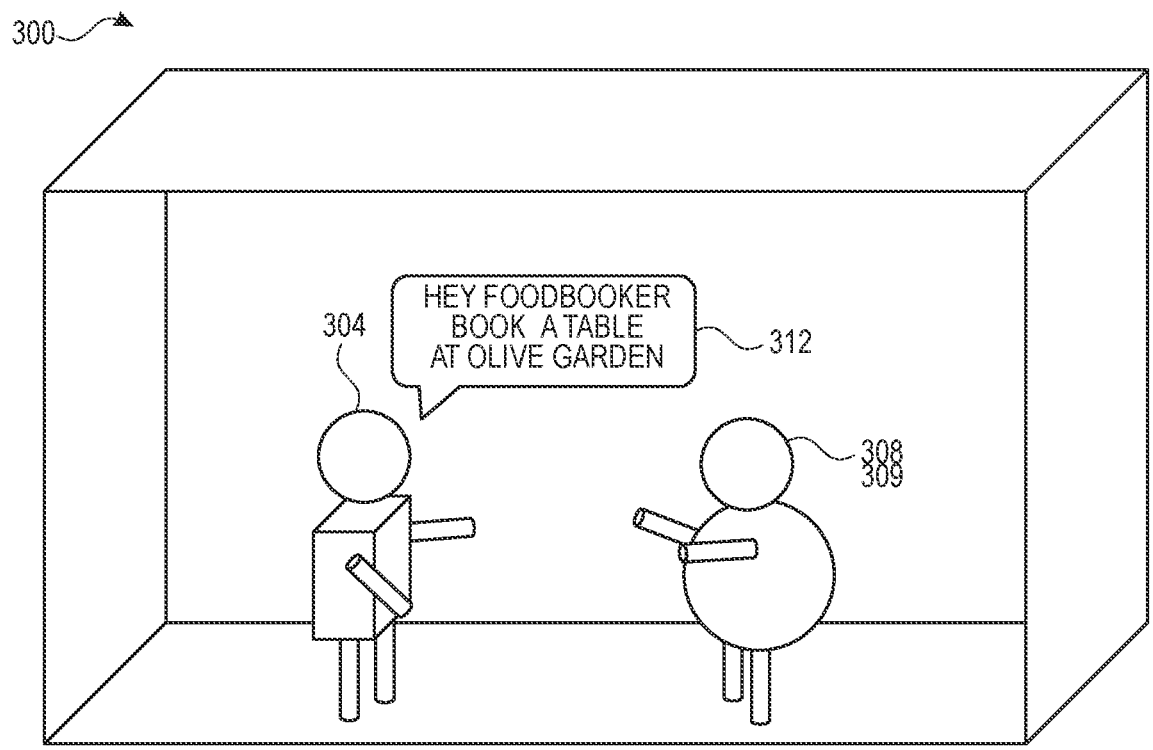
Figure 3D:
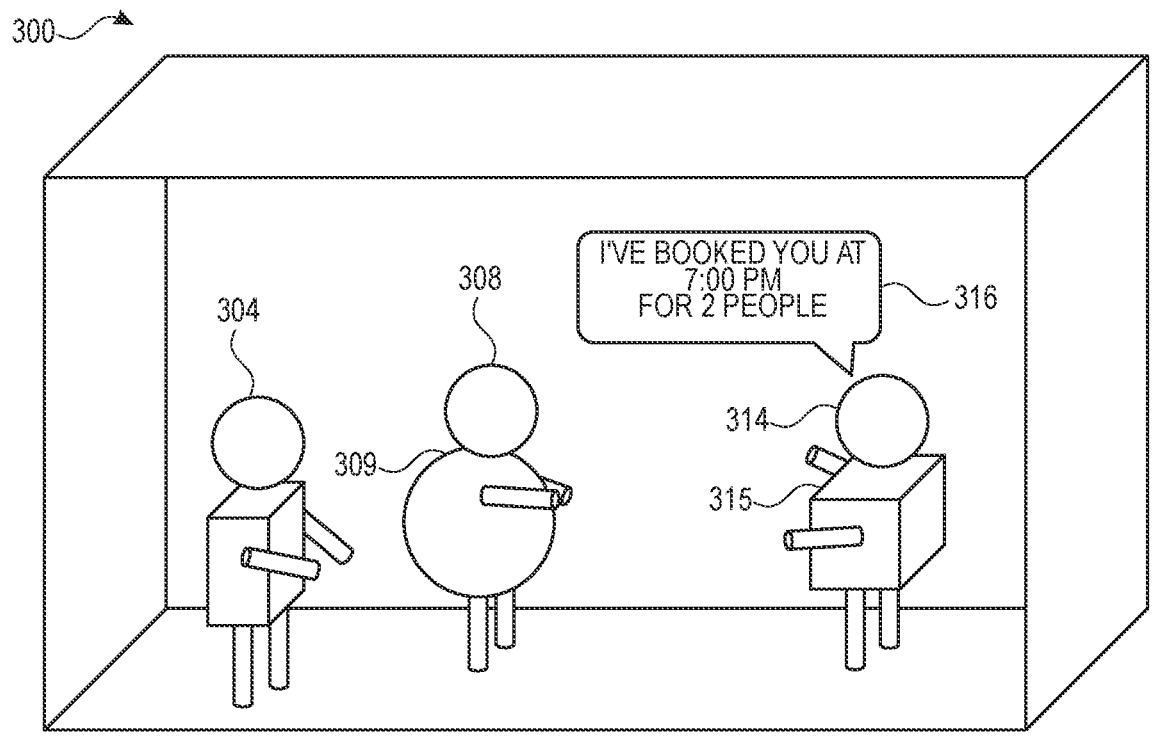
Figure 4A:
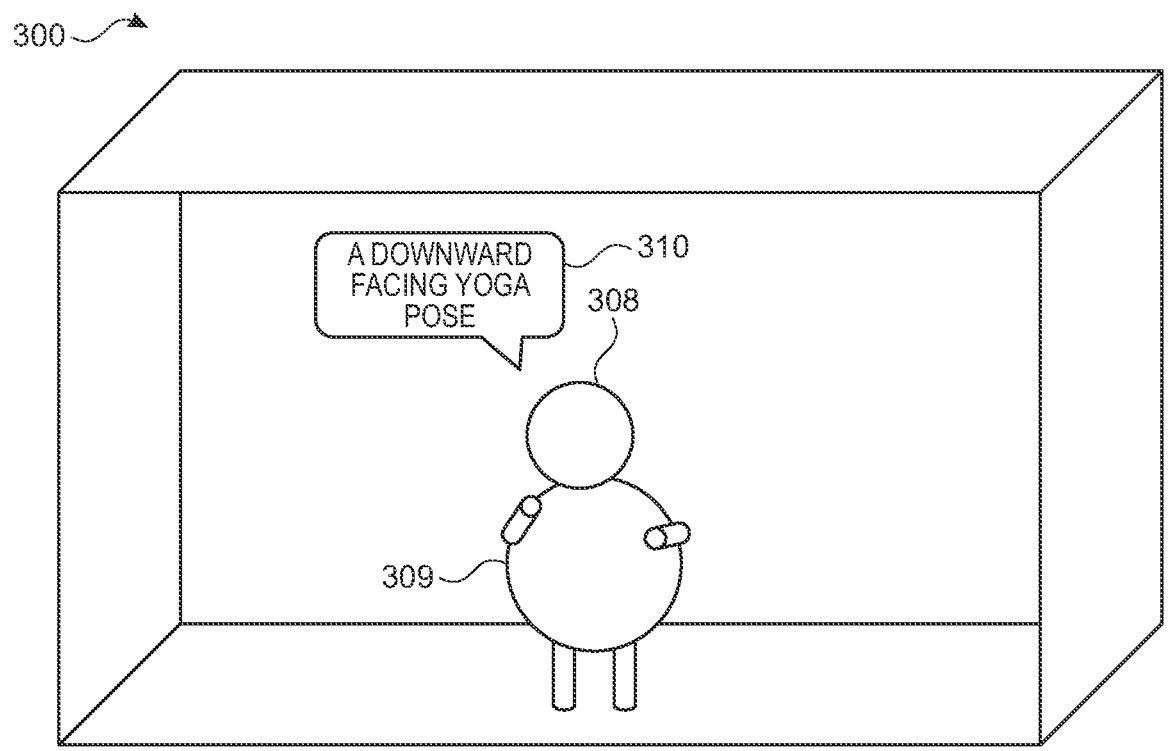
FIGS. 4A-4C illustrate an extended reality environment from a perspective of a user, according to various examples.

In turn, system 100 provides (e.g., outputs) response 310 to the user. With reference to FIG. 4A, in some examples, response 310 is provided as a visual output (e.g., text displayed in XR environment 300) and/or as an audible output (e.g., audio provided via a speaker of system 100). In some examples, response 310 is provided in a manner such that avatar 308 looks to be speaking one or more words of response 310. System 100 may, for instance, coordinate movement of a mouth of avatar 308 when providing response 310 to simulate avatar 308 speaking response 310. In some examples, response 310 is provided using a predefined voice setting (e.g., pitch, timbre, volume, accent, tone, etc.) and/or predefined language setting (e.g., US English, UK English, French) corresponding to avatar 308 and/or domain-specific digital assistant 309. FIGS. 3C-3D illustrate an example in which a user input represents an intent to invoke a domain-specific digital assistant.

With reference to FIG. 3C, in an example operation, system 100 receives user input 312 ("Hey FoodBooker, book me a table at Olive Garden") and determines whether user input 312 represents an intent to invoke a digital assistant of system 100.

For example, with reference to FIG. 3D, system 100 may determine that user input 312 includes a digital assistant trigger (e.g., "Hey FoodBooker") for domain-specific digital assistant 315 (e.g., a domain-specific digital assistant for a restaurant reservation domain) and determine that user input 312 represents an intent to invoke domain-specific digital assistant 315. As another example, system 100 may determine that a domain of user input 312 matches a domain of domain-specific digital assistant 315 and determine that user input 312 represents an intent to invoke domain-specific digital assistant 315. Both user input 312 and digital assistant 315 may correspond to a restaurant reservation domain, for instance. Additionally or alternatively, system 100 may determine that a domain of user input 312 matches a domain of an application associated with digital assistant 315 and determine that user input 312 represents an intent to invoke domain-specific digital assistant 315.

Figure 4B:
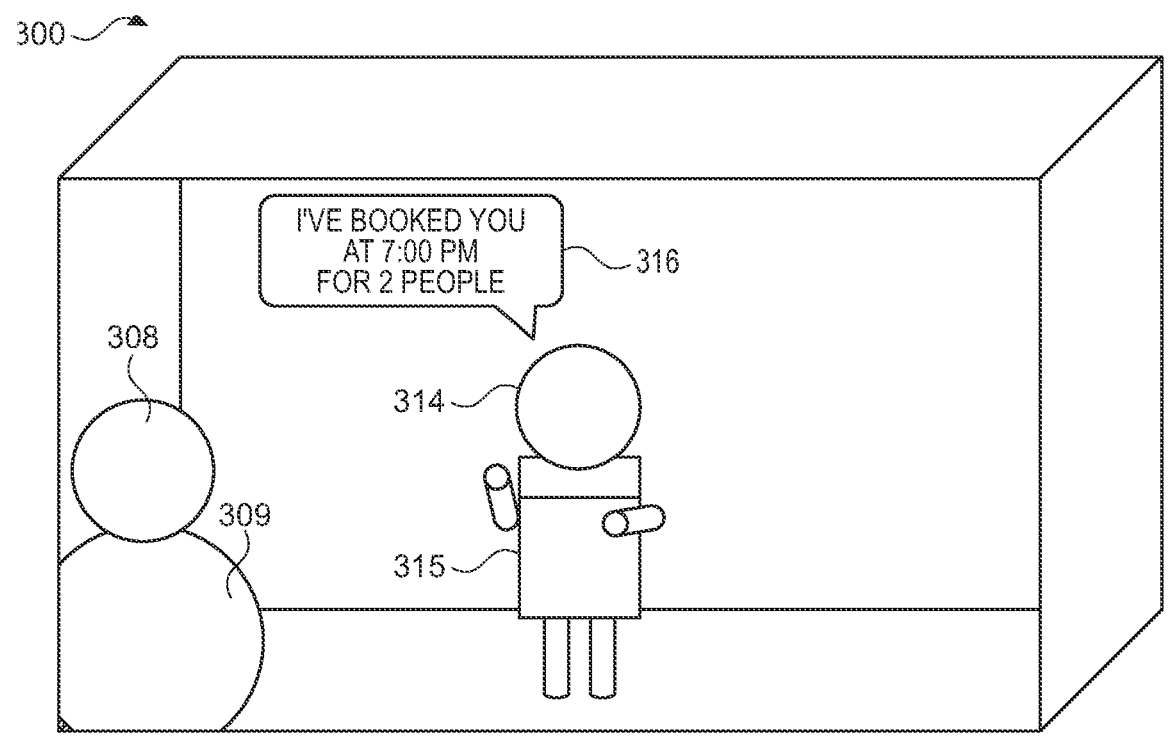

In response to determining that user input 312 represents an intent to invoke domain-specific digital assistant 315, system 100 invokes domain-specific digital assistant 315. With reference to FIG. 4B, in some examples, invoking digital assistant 315 causes system 100 to display a representation of the digital assistant 315 in XR environment 300. By way of example, as illustrated in FIG. 3D, system 100 may display a visual representation of digital assistant 315, such as avatar 314, uniquely distinguishing digital assistant 315 from other digital assistants. As shown, in some examples, avatar 308 representing digital assistant 309 and avatar 314 (or another visual representation) representing digital assistant 315 are displayed concurrently. In other examples, system 100 ceases display of avatar 308 when displaying avatar 314 (or another visual representation). In some examples, system 100 forgoes displaying avatar 314 (or another visual representation) when invoking digital assistant 315.

In some examples, XR environment 300 is suspended (e.g., held in a static state) during a period of time in which digital assistant 315 is invoked. In this manner, a user may interact with digital assistant 315 without missing content and/or changes to XR environment 300 while interacting with digital assistant 321. In some examples, suspending XR environment 300 includes suspending the entirety of XR environment 300. In other examples, suspending XR environment 300 includes suspending a portion of XR environment 300. System 100 may, for instance, suspend only virtual objects within a threshold distance of a user in some examples.

Once invoked, digital assistant 315 processes user input 312 and, optionally, generates a response, such as the response 316 ("I've booked you at 7:00 PM for 2 people").

In turn, system 100 provides (e.g., outputs) response 316 to the user. In some examples, response 316 is provided as a visual output (e.g., text displayed in XR environment 300) and/or as an audible output (e.g., audio provided via a speaker of system 100). In some examples, response 316 is provided in a manner such that avatar 314 looks to be speaking one or more words of response 316. System 100 may, for instance, coordinate movement of a mouth of avatar 314 when providing response 316 to simulate avatar 314 speaking response 316. In some examples, response 316 is provided using a predefined voice setting (e.g., pitch, timbre, volume, accent, tone, etc.) and/or predefined language setting (e.g., US English, UK English, French) corresponding to either of avatar 314 and domain-specific digital assistant 315.

Figure 3E:
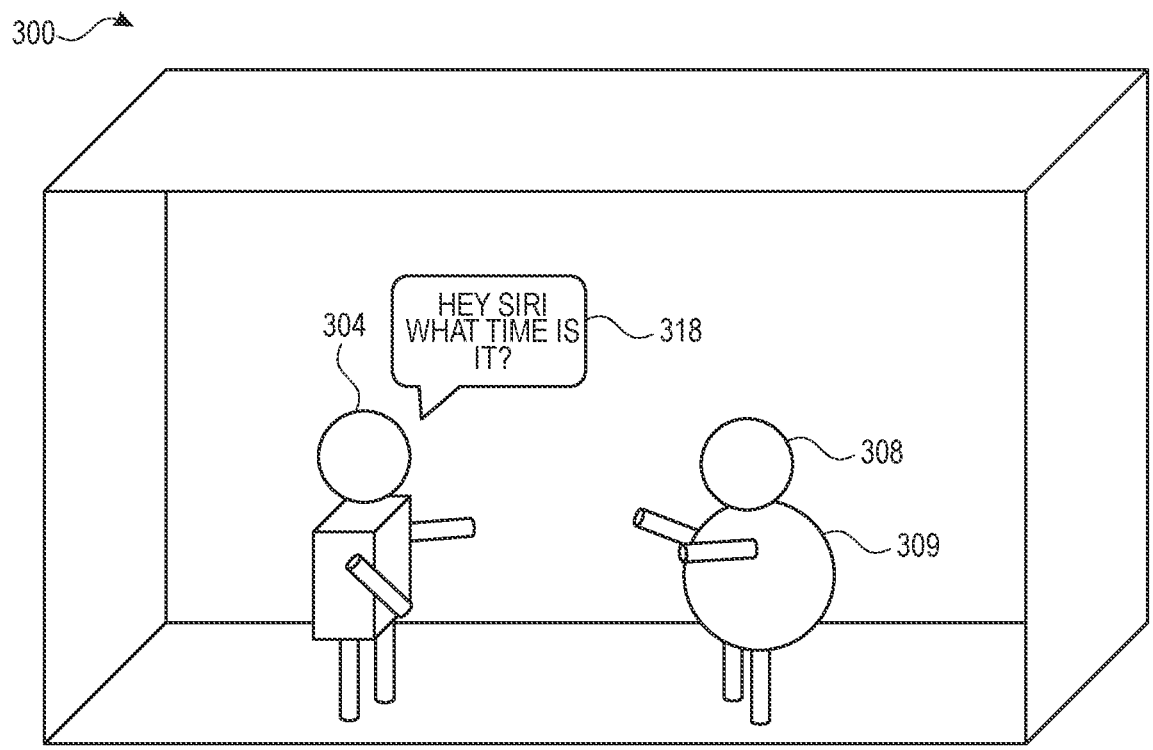
Figure 3F:
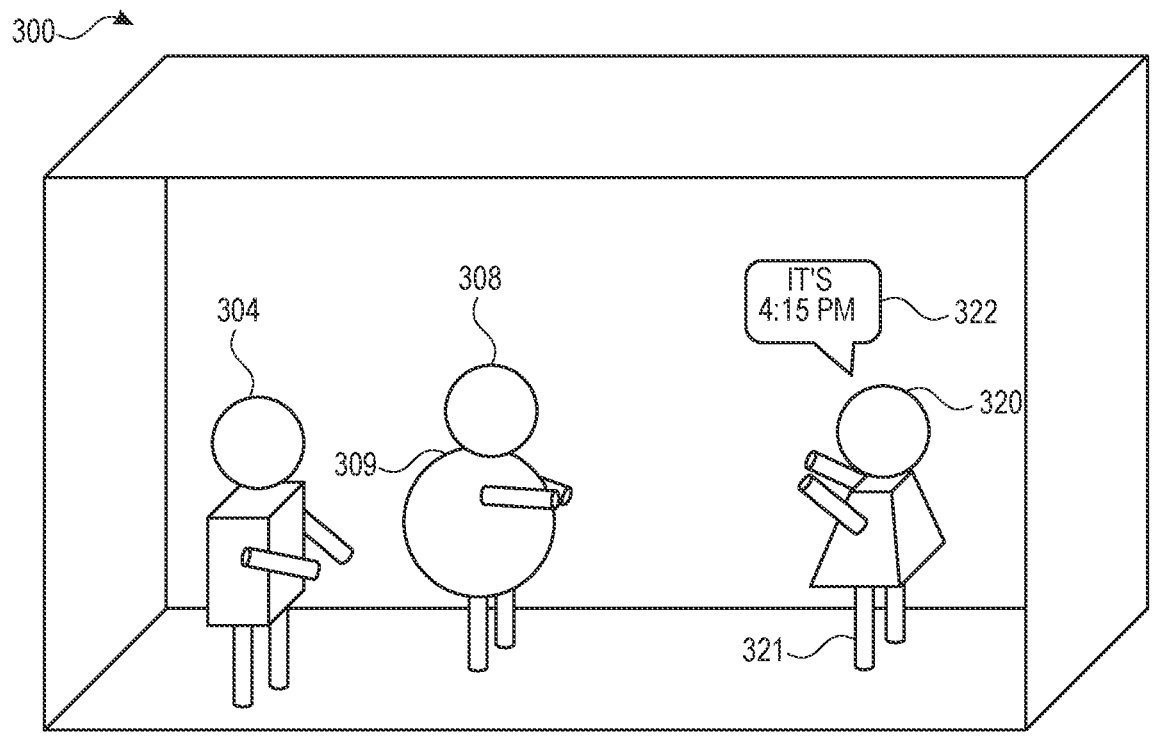

FIGS. 3E-3F illustrate an example in which a user input represents an intent to invoke a general digital assistant.

With reference to FIG. 3E, in an example operation, system 100 receives user input 318 ("What time is it"), determines whether the user input 318 represents an intent to invoke a digital assistant of system 100.

For example, with reference to FIG. 3F, system 100 may determine that user input 318 includes a digital assistant trigger for general digital assistant 321 (e.g., "Hey Siri") and determine that user input 318 represents an intent to invoke general digital assistant 321. As another example, system 100 may determine that a domain of user input 321 does not match a domain of any domain-specific digital assistants of system 100 and determine that user input 318 represents an intent to invoke general digital assistant 321. As yet another example, system 100 may determine that a domain of user input 318 does not correspond to any software applications of system 100 having a domain-specific digital assistant and determine that user input 318 represents an intent to invoke general digital assistant 321. As yet another example, system 100 may determine that a domain of user input 318 matches a domain of the active ontology of system 100 and determine that user input 318 represents an intent to invoke general digital assistant 321.

Figure 4C:
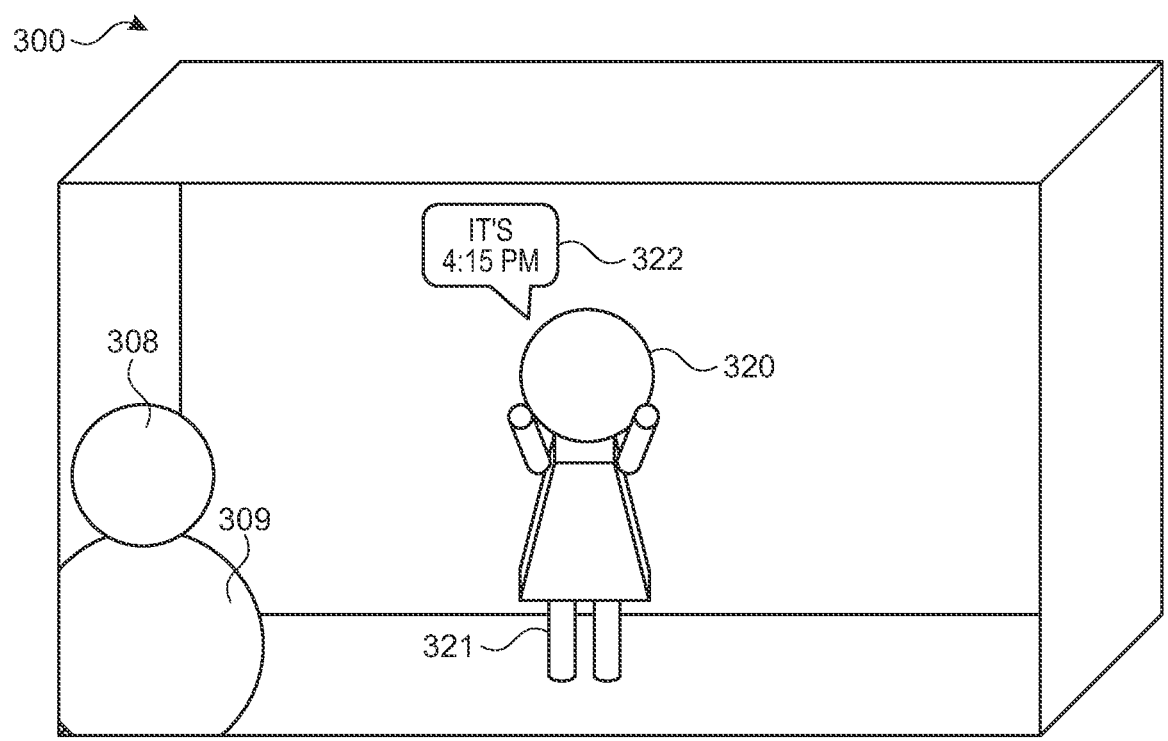

In response to determining that user input 318 represents an intent to invoke general digital assistant 321, system 100 invokes general digital assistant 321. With reference to FIG. 4C, in some examples, invoking general digital assistant 321 causes system 100 to display a representation of the digital assistant 321 in XR environment 300. By way of example, as illustrated in FIG. 3F, system 100 may display a visual representation of digital assistant 321, such as avatar 320, uniquely distinguishing digital assistant 321 from other digital assistants. In other examples, visual representations of digital assistant 321 include but are not limited to two-dimensional shapes (e.g., circle), three-dimensional shapes (e.g., orb), animations, or any combination thereof. As shown, in some examples, avatar 320 (or another visual representation) representing digital assistant 321 and avatar 308 representing digital assistant 309 are displayed concurrently. In other examples, system 100 ceases display of avatar 308 when displaying avatar 320 (or another visual representation). In some examples, system 100 forgoes displaying avatar 320 (or another visual representation) when invoking digital assistant 321. In some examples, avatar 320 (or another visual representation) representing digital assistant 321 is always concurrently displayed with avatar 308 in XR environment 300.

In some examples, XR environment 300 is suspended (e.g., held in a static state) while digital assistant 321 is invoked. In this manner, a user may interact with digital assistant 321 without missing content and/or changes to XR environment 300 while interacting with digital assistant 321.

Once invoked, digital assistant 321 processes user input 318 and, optionally, generates a response, such as the response 322 ("It's 4:15 PM").

In turn, system 100 provides (e.g., outputs) response 322 to the user. In some examples, response 322 is provided as a visual output (e.g., text displayed in XR environment 300) and/or as an audible output (e.g., audio provided via a speaker of system 100). In some examples, response 322 is provided in a manner such that avatar 320 looks to be speaking one or more words of response 322. System 100 may, for instance, coordinate movement of a mouth of avatar 320 when providing response 322 to simulate avatar 320 speaking response 322. In some examples, response 322 is provided using a predefined voice setting (e.g., pitch, timbre, volume, accent, tone, etc.) and/or predefined language setting (e.g., US English, UK English, French) corresponding to either of avatar 320 and domain-specific digital assistant 321.

While examples set forth herein are generally directed to invoking digital assistants using system 100, it will be appreciated that digital assistants may be invoked using any system or device(s) including but not limited to mobile phones, smartwatches, desktop computers, laptop computers, tablets, set-top boxes, or any combination thereof. It will further be appreciated that some aspects of the described invention may be implemented using a first device, while other aspects may be implemented using the first device and/or one or more other devices in communication the first device. By way of example, a first device may provide an environment (e.g., XR environment) by which the user interacts with one or more digital assistants, and a second device may perform natural language processing on behalf the one or more digital assistants.

It will further be appreciated that while described examples are directed to implementing digital assistants in an XR environment, examples of the present invention are not so limited and may be implemented without the use of extended reality. By way of example, system 100 (or another system or device) may select a digital assistant from a set of digital assistants to process a user input when not providing (e.g., displaying) an XR environment.

Figure 5:
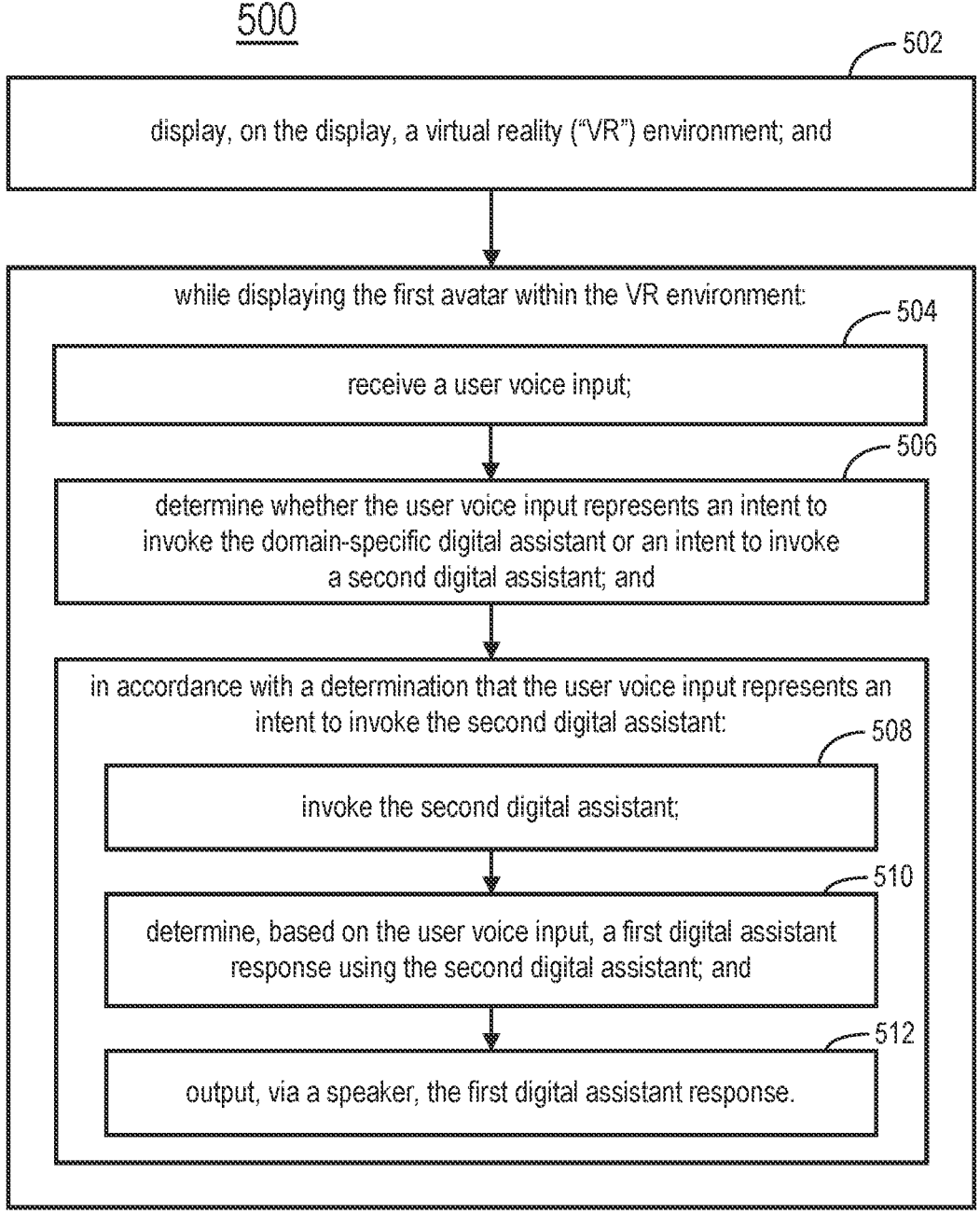
FIG. 5 depicts a flow diagram of an exemplary method for invoking a digital assistant, according to various examples.

FIG. 5 is a flow diagram illustrating a process for invoking a digital assistant, according to various examples. Method 500 is performed at a device (e.g., device 100). The device can, optionally, include one or more processors, memory, a display, or any combination thereof. In some examples, the device includes one or more input devices (e.g., a touchscreen, a mic, a camera), and a wireless communication radio (e.g., a Bluetooth connection, WiFi connection, a mobile broadband connection, such as a 4G LTE connection). In some examples, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 500 are, optionally, combined, the orders of some operations are, optionally, changed, and some operations are, optionally, omitted. While the method 500 is described as being implemented with a VR environment, it will be appreciated that the method 500 may be implemented using any type of XR environment, such as an AR environment.

At block 502, an electronic device displays, on a display of the electronic device, a virtual reality ("VR") environment. In some examples, the VR environment is an application-specific VR environment (e.g., a yoga or meditation VR environment for a yoga or meditation software application stored on the electronic device).). In some examples, the VR environment includes a first avatar representing a domain-specific digital assistant. In some examples, a domain-specific digital assistant corresponds to a single software application stored on the electronic device (e.g., the domain-specific digital assistant only responds to user requests or commands relating to or associated with the single software application). In some examples, the domain-specific digital assistant corresponds to a single domain of an active ontology (e.g., navigation, weather, restaurant reservations, etc.) such that the domain-specific digital assistant only responds to user requests or commands relating to or associated with the single domain. In some examples, a domain-specific digital assistant has access to a knowledge base that a general digital assistant of the electronic device does not have access to (e.g., a remotely-stored knowledge base for a third-party software application (e.g., third-party software application data stored on a remote server). In some examples, a domain-specific digital assistant is capable of performing one or more functions and/or actions that a general digital assistant is not capable of performing (e.g., placing an online order for a specific cup of coffee via a Starbucks software application stored on the electronic device). In some examples, the domain-specific digital assistant corresponds to a first domain. In some examples, the domain-specific digital corresponds to a software application, wherein the software application is associated with one or more domains of an active ontology (e.g., a yoga software application is associated with a general exercise/workout domain as well as a more specific yoga domain (e.g., which is a sub-domain of the exercise domain)).

At block 504, while displaying the first avatar within the VR environment, the electronic device receives a user voice input (e.g., from a user of the electronic device).

At block 506, while displaying the first avatar within the VR environment, the electronic device determines whether the user voice input represents an intent to invoke the domain-specific digital assistant or an intent to invoke a second digital assistant. In some examples, the second digital assistant is a general (e.g., system-wide, domain-agnostic, or the like) digital assistant (e.g., Siri). In some examples, the second digital assistant is a second domain-specific digital assistant. In some examples, this determination includes determining whether the user voice input includes a first digital assistant trigger corresponding to the domain-specific digital assistant or a second digital assistant trigger corresponding to the second digital assistant (e.g., "Hey Siri"). In some examples, this determination includes determining whether a gaze of a user of the electronic device is directed at the first avatar when the user voice input is received or within a predetermined period of time after the user voice input is received. In some examples, this determination includes performing natural language processing based on the user voice input to determine a domain associated with the user voice input, and determining whether the determined domain matches the first domain corresponding to the domain-specific digital assistant or a second domain corresponding to the second digital assistant.

At block 508, in accordance with a determination that the user voice input represents an intent to invoke the second digital assistant, the electronic device invokes the second digital assistant digital assistant. In some examples, invoking the second digital assistant includes displaying a digital assistant icon corresponding to the second digital assistant (e.g., a specific icon for the second digital assistant not used by any other digital assistant of the electronic device) within the VR environment. In some examples, invoking the second digital assistant includes displaying a second avatar within the VR environment.

At block 510, in accordance with a determination that the user voice input represents an intent to invoke the second digital assistant, the electronic device determines, based on the user voice input, a first digital assistant response using the second digital assistant. (e.g., using an NLP module of the second digital assistant, a task flow module of the second digital assistant, and/or a services module of the second digital assistant). In some examples, determining the first digital assistant response includes the second digital assistant NLP module (e.g., a general NLP module or a domain-specific NLP module) generating a structured query (e.g., a domain-specific structured query), and the second digital assistant task flow module processing/completing the structured query (and thus performing one or more tasks). In some examples, processing/completing the structured query using the second digital assistant task flow module includes the second digital assistant task flow module working with a second digital assistant services module (e.g., a domain-specific services module) in order to process/complete the structured query).

At block 512, in accordance with a determination that the user voice input represents an intent to invoke the second digital assistant, the electronic device outputs, via a speaker, the first digital assistant response (e.g., based on results of one or more tasks performed by the second digital assistant). In some examples, the speaker is a speaker of the electronic device (e.g., a speaker of a mobile phone). In some examples, the speaker is a speaker of a second electronic device that is communicatively connected to the electronic device (e.g., a speaker of a VR headset connected to a mobile device).

In some examples, determining whether the user voice input represents an intent to invoke the domain-specific digital assistant or an intent to invoke a second digital assistant includes determining whether the user voice input includes a first digital assistant trigger corresponding to the domain-specific digital assistant or a second digital assistant trigger corresponding to the second digital assistant.

In some examples, in accordance with a determination that the user voice input does not include the first digital assistant trigger or the second digital assistant trigger, the electronic device determines whether a gaze of a user of the electronic device is directed at the first avatar when the user voice input is received (e.g., at a time when the user voice input ends). In some examples, in response to determining that the gaze of the user is directed at the first avatar when the user voice input is received, the electronic device performs natural language processing based on the user voice input to determine a domain associated with the user voice input.

In some examples, in accordance with a determination that the gaze of the user is not directed at the first avatar when the user voice input is received, the electronic device determines whether the gaze of the user is directed at the first avatar within a predetermined period of time after the user voice input is received (e.g., within 0.5 seconds, 1 second, 2 seconds, or the like). In some examples, in response to determining that the gaze of the user is directed at the first avatar within the predetermined period of time, the electronic device performs natural language processing based on the user voice input to determine a domain associated with the user voice input.

In some examples, in response to determining that the gaze of the user is not directed at the first avatar within the predetermined period of time, the electronic device forgoes further processing of the user voice input (e.g., forgoing natural language processing, task flow processing, and/or the like).

In some examples, the electronic device determines whether the determined domain associated with the user voice input matches the first domain corresponding to the domain-specific digital assistant. In some examples, this determination further includes determining whether the determined domain is associated with a software application corresponding to the domain-specific digital assistant. In some examples, a software application is associated with one or more domains of an ontology.

In some examples, in accordance with a determination that the determined domain matches the first domain, the electronic device determines, based on the user voice input, a second digital assistant response using the domain-specific digital assistant (e.g., using one or more modules of the domain-specific digital assistant that are separate and distinct from modules of the second digital assistant). In some examples, the electronic device outputs, via the speaker, the second digital assistant response (e.g., instead of the first digital assistant response). In some examples, the electronic device outputs the first audio output such that the first avatar appears to be speaking the first audio output (e.g., the electronic device coordinates movement of a mouth of the first avatar with the output of the first audio output.). In some examples, the electronic device outputs the first audio output based on at least one of a predefined voice setting associated with the domain-specific digital assistant or a predefined language setting associated with the domain-specific digital assistant.

In some examples, the electronic device invokes the second digital assistant in response to determining that the determined domain does not match the first domain. In some examples, the electronic device invokes the second digital assistant in response to determining that the determined domain is not associated with a software application corresponding to the domain-specific digital assistant (e.g., instead of or in addition to determining that the determined domain does not match the first domain).

In some examples, in response to determining that the determined domain does not match the first domain and prior to invoking the second digital assistant, the electronic device outputs a first audio output that informs the user of the electronic device that the domain-specific digital assistant is not capable of providing a digital assistant response based on the user voice input. In some examples, the electronic device outputs the first audio output such that the first avatar appears to be speaking the first audio output (e.g., the electronic device coordinates movement of a mouth of the first avatar with the output of the first audio output.). In some examples, the electronic device outputs the first audio output based on at least one of a predefined voice setting associated with the domain-specific digital assistant or a predefined language setting associated with the domain-specific digital assistant. In some examples, in addition to or instead of the first audio output, the electronic device displays, within the VR environment, a first notification (e.g., including text) that informs the user that the domain-specific digital assistant is not capable of providing a digital assistant response based on the user voice input.

In some examples, the first audio output includes a user query that requests user approval to invoke the second digital assistant. In some examples, the electronic device invokes the second digital assistant in response to receiving a user input (e.g., a second user voice input or a user selection of an affordance displayed in the VR environment) representing a user approval for invoking the second digital assistant.

In some examples, invoking the second digital assistant includes displaying, within the VR environment, a second avatar representing the second digital assistant (e.g., while still displaying the first avatar). In some examples, invoking the second digital assistant alternatively or additionally includes displaying a digital assistant icon representing the second digital assistant.

In some examples, the electronic device outputs the first digital assistant response such that the second avatar appears to be speaking the first digital assistant response. In some examples, the electronic device coordinates movement of a mouth of the second avatar with the output of the first digital assistant response.

In some examples, the electronic device outputs the first digital assistant response based on at least one of a predefined voice setting associated with the second digital assistant and a predefined language setting associated with the second digital assistant. In some examples, each digital assistant may have one or more unique voice characteristics (e.g., accent, pitch, rate, tone, etc.) or language settings (languages, accents, dialects, use of vernacular terms). In some examples, third party applications may specify one or more voice characteristics for digital assistants.

In some examples, the domain-specific digital assistant determines digital assistant responses only for user inputs (e.g., user voice inputs, user gesture inputs, user text inputs, etc.) associated with the first domain.

In some examples, the second digital assistant is a system-wide digital assistant that is capable of determining a digital assistant response for user inputs associated with any domain included in an ontology of the electronic device (e.g., including the first domain).

In some examples, the second digital assistant is a second domain-specific digital assistant corresponding to a second domain that is different from the first domain, and wherein the second domain-specific digital assistant determines digital assistant responses only for user inputs associated with the second domain.

Various processes defined herein consider the option of obtaining and utilizing a user's personal information. For example, such personal information may be utilized in order to provide improved digital assistant responses. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

What is claimed is:

1. A non-transitory computer-readable storage medium storing one or more programs, the one or more programs comprising instructions, which when executed by one or more processors of an electronic device having a display, cause the electronic device to:
  display, on the display, a virtual reality ("VR") environment, wherein the VR environment includes a first avatar representing a domain-specific digital assistant, wherein the domain-specific digital assistant corresponds to a first domain, and wherein the domain-specific digital assistant corresponds to a single software application stored on the electronic device; and
  while displaying the first avatar within the VR environment:
    receive a user voice input;
    determine whether the user voice input represents an intent to invoke the domain-specific digital assistant or an intent to invoke a second digital assistant; and
    in accordance with a determination that the user voice input represents an intent to invoke the second digital assistant:
      invoke the second digital assistant, wherein virtual objects within a threshold distance of a user are suspended during a first period of time while the second digital assistant is invoked;
      determine, based on the user voice input, a first digital assistant response using the second digital assistant; and
      output, via a speaker, the first digital assistant response.

2. The non-transitory computer-readable storage medium of claim 1, wherein determining whether the user voice input represents the intent to invoke the domain-specific digital assistant or the intent to invoke a second digital assistant includes:
  determining whether the user voice input includes a first digital assistant trigger corresponding to the domain-specific digital assistant or a second digital assistant trigger corresponding to the second digital assistant.

3. The non-transitory computer-readable storage medium of claim 2, wherein the one or more programs further comprise instructions, which when executed by the one or more processors, cause the electronic device to:
  in accordance with a determination that the user voice input does not include the first digital assistant trigger or the second digital assistant trigger, determine whether a gaze of the user of the electronic device is directed at the first avatar when the user voice input is received; and in response to determining that the gaze of the user is directed at the first avatar when the user voice input is received, perform natural language processing based on the user voice input to determine a domain associated with the user voice input.

4. The non-transitory computer-readable storage medium of claim 3, wherein the one or more programs further comprise instructions, which when executed by the one or more processors, cause the electronic device to:
in accordance with a determination that the gaze of the user is not directed at the first avatar when the user voice input is received, determine whether the gaze of the user is directed at the first avatar within a predetermined period of time after the user voice input is received; and
in response to determining that the gaze of the user is directed at the first avatar within the predetermined period of time, perform natural language processing based on the user voice input to determine a domain associated with the user voice input.

5. The non-transitory computer-readable storage medium of claim 4, wherein the one or more programs further comprise instructions, which when executed by the one or more processors, cause the electronic device to:
in response to determining that the gaze of the user is not directed at the first avatar within the predetermined period of time, forgo further processing of the user voice input.

6. The non-transitory computer-readable storage medium of claim 3, wherein the one or more programs further comprise instructions, which when executed by the one or more processors, cause the electronic device to:
determine whether the determined domain associated with the user voice input matches the first domain corresponding to the domain-specific digital assistant.

7. The non-transitory computer-readable storage medium of claim 6, wherein the one or more programs further comprise instructions, which when executed by the one or more processors, cause the electronic device to:
in accordance with a determination that the determined domain matches the first domain, determine, based on the user voice input, a second digital assistant response using the domain-specific digital assistant; and
output, via the speaker, the second digital assistant response.

8. The non-transitory computer-readable storage medium of claim 6, wherein the electronic device invokes the second digital assistant in response to determining that the determined domain does not match the first domain.

9. The non-transitory computer-readable storage medium of claim 8, wherein the one or more programs further comprise instructions, which when executed by the one or more processors, cause the electronic device to:
in response to determining that the determined domain does not match the first domain and prior to invoking the second digital assistant:
output a first audio output that informs the user of the electronic device that the domain-specific digital assistant is not capable of providing a digital assistant response based on the user voice input.

10. The non-transitory computer-readable storage medium of claim 9, wherein the first audio output includes a user query that requests user approval to invoke the second digital assistant, and wherein the electronic device invokes the second digital assistant in response to receiving a user input representing a user approval for invoking the second digital assistant.

11. The non-transitory computer-readable storage medium of claim 1, wherein invoking the second digital assistant includes displaying, within the VR environment, a second avatar representing the second digital assistant.

12. The non-transitory computer-readable storage medium of claim 11, wherein the electronic device outputs the first digital assistant response such that the second avatar appears to be speaking the first digital assistant response.

13. The non-transitory computer-readable storage medium of claim 1, wherein the electronic device outputs the first digital assistant response based on at least one of a predefined voice setting associated with the second digital assistant and a predefined language setting associated with the second digital assistant.

14. The non-transitory computer-readable storage medium of claim 1, wherein the domain-specific digital assistant determines digital assistant responses only for user inputs associated with the first domain.

15. The non-transitory computer-readable storage medium of claim 1, wherein the second digital assistant is a system-wide digital assistant that is capable of determining a digital assistant response for user inputs associated with any domain included in an ontology of the electronic device.

16. The non-transitory computer-readable storage medium of claim 1, wherein the second digital assistant is a second domain-specific digital assistant corresponding to a second domain that is different from the first domain, and wherein the second domain-specific digital assistant determines digital assistant responses only for user inputs associated with the second domain.

17. An electronic device comprising:
a display;
one or more processors;
a memory; and
one or more programs, wherein the one or more programs are stored in the memory and configured to be executed by the one or more processors, the one or more programs including instructions for:
displaying, on the display, a virtual reality ("VR") environment, wherein the VR environment includes a first avatar representing a domain-specific digital assistant, wherein the domain-specific digital assistant corresponds to a first domain, and wherein the domain-specific digital assistant corresponds to a single software application stored on the electronic device; and
while displaying the first avatar within the VR environment:
receiving a user voice input;
determining whether the user voice input represents an intent to invoke the domain-specific digital assistant or an intent to invoke a second digital assistant; and
in accordance with a determination that the user voice input represents an intent to invoke the second digital assistant:
invoking the second digital assistant, wherein virtual objects within a threshold distance of a user are suspended during a first period of time while the second digital assistant is invoked;
determining, based on the user voice input, a first digital assistant response using the second digital assistant; and
outputting, via a speaker, the first digital assistant response.

18. The electronic device of claim 17, wherein determining whether the user voice input represents the intent to invoke the domain-specific digital assistant or the intent to invoke a second digital assistant includes:
    determining whether the user voice input includes a first digital assistant trigger corresponding to the domain-specific digital assistant or a second digital assistant trigger corresponding to the second digital assistant.

19. The electronic device of claim 18, wherein the one or more programs further include instructions for:
    in accordance with a determination that the user voice input does not include the first digital assistant trigger or the second digital assistant trigger, determining whether a gaze of the user of the electronic device is directed at the first avatar when the user voice input is received; and
    in response to determining that the gaze of the user is directed at the first avatar when the user voice input is received, performing natural language processing based on the user voice input to determine a domain associated with the user voice input.

20. The electronic device of claim 19, wherein the one or more programs further include instructions for:
    in accordance with a determination that the gaze of the user is not directed at the first avatar when the user voice input is received, determining whether the gaze of the user is directed at the first avatar within a predetermined period of time after the user voice input is received; and
    in response to determining that the gaze of the user is directed at the first avatar within the predetermined period of time, performing natural language processing based on the user voice input to determine a domain associated with the user voice input.

21. The electronic device of claim 20, wherein the one or more programs further include instructions for:
    in response to determining that the gaze of the user is not directed at the first avatar within the predetermined period of time, forgoing further processing of the user voice input.

22. The electronic device of claim 19, wherein the one or more programs further include instructions for:
    determining whether the determined domain associated with the user voice input matches the first domain corresponding to the domain-specific digital assistant.

23. The electronic device of claim 22, wherein the one or more programs further include instructions for:
    in accordance with a determination that the determined domain matches the first domain, determining, based on the user voice input, a second digital assistant response using the domain-specific digital assistant; and
    outputting, via the speaker, the second digital assistant response.

24. The electronic device of claim 22, wherein the electronic device invokes the second digital assistant in response to determining that the determined domain does not match the first domain.

25. The electronic device of claim 17, wherein invoking the second digital assistant includes displaying, within the VR environment, a second avatar representing the second digital assistant.

26. The electronic device of claim 25, wherein the electronic device outputs the first digital assistant response such that the second avatar appears to be speaking the first digital assistant response.

27. The electronic device of claim 17, wherein the electronic device outputs the first digital assistant response based on at least one of a predefined voice setting associated with the second digital assistant and a predefined language setting associated with the second digital assistant.

28. The electronic device of claim 17, wherein the second digital assistant is a system-wide digital assistant that is capable of determining a digital assistant response for user inputs associated with any domain included in an ontology of the electronic device.

29. The electronic device of claim 17, wherein the second digital assistant is a second domain-specific digital assistant corresponding to a second domain that is different from the first domain, and wherein the second domain-specific digital assistant determines digital assistant responses only for user inputs associated with the second domain.

30. A method, comprising:
    at an electronic device having one or more processors, memory, and a display:
        displaying, on the display, a virtual reality ("VR") environment, wherein the VR environment includes a first avatar representing a domain-specific digital assistant, wherein the domain-specific digital assistant corresponds to a first domain, and wherein the domain-specific digital assistant corresponds to a single software application stored on the electronic device; and
        while displaying the first avatar within the VR environment:
            receiving a user voice input;
            determining whether the user voice input represents an intent to invoke the domain-specific digital assistant or an intent to invoke a second digital assistant; and
            in accordance with a determination that the user voice input represents an intent to invoke the second digital assistant:
                invoking the second digital assistant, wherein virtual objects within a threshold distance of a user are suspended during a first period of time while the second digital assistant is invoked;
                determining, based on the user voice input, a first digital assistant response using the second digital assistant; and
                outputting, via a speaker, the first digital assistant response.

31. The method of claim 30, wherein determining whether the user voice input represents the intent to invoke the domain-specific digital assistant or the intent to invoke a second digital assistant includes:
    determining whether the user voice input includes a first digital assistant trigger corresponding to the domain-specific digital assistant or a second digital assistant trigger corresponding to the second digital assistant.

32. The method of claim 31, further comprising:
    in accordance with a determination that the user voice input does not include the first digital assistant trigger or the second digital assistant trigger, determining whether a gaze of the user of the electronic device is directed at the first avatar when the user voice input is received; and
    in response to determining that the gaze of the user is directed at the first avatar when the user voice input is received, performing natural language processing based on the user voice input to determine a domain associated with the user voice input.

33. The method of claim 32, further comprising:
    in accordance with a determination that the gaze of the user is not directed at the first avatar when the user voice input is received, determining whether the gaze of the user is directed at the first avatar within a predetermined period of time after the user voice input is received; and in response to determining that the gaze of the user is directed at the first avatar within the predetermined period of time, performing natural language processing based on the user voice input to determine a domain associated with the user voice input.

34. The method of claim 33, further comprising:
in response to determining that the gaze of the user is not directed at the first avatar within the predetermined period of time, forgoing further processing of the user voice input.

35. The method of claim 32, further comprising:
determining whether the determined domain associated with the user voice input matches the first domain corresponding to the domain-specific digital assistant.

36. The method of claim 35, further comprising:
in accordance with a determination that the determined domain matches the first domain, determining, based on the user voice input, a second digital assistant response using the domain-specific digital assistant; and outputting, via the speaker, the second digital assistant response.

37. The method of claim 35, wherein the electronic device invokes the second digital assistant in response to determining that the determined domain does not match the first domain.

38. The method of claim 30, wherein invoking the second digital assistant includes displaying, within the VR environment, a second avatar representing the second digital assistant.

39. The method of claim 38, wherein the electronic device outputs the first digital assistant response such that the second avatar appears to be speaking the first digital assistant response.

40. The method of claim 30, wherein the electronic device outputs the first digital assistant response based on at least one of a predefined voice setting associated with the second digital assistant and a predefined language setting associated with the second digital assistant.

41. The method of claim 30, wherein the second digital assistant is a system-wide digital assistant that is capable of determining a digital assistant response for user inputs associated with any domain included in an ontology of the electronic device.

42. The method of claim 30, wherein the second digital assistant is a second domain- specific digital assistant corresponding to a second domain that is different from the first domain, and wherein the second domain-specific digital assistant determines digital assistant responses only for user inputs associated with the second domain.

* * * * *